(12) United States Patent
Murakami et al.

(10) Patent No.: US 10,060,497 B2
(45) Date of Patent: Aug. 28, 2018

(54) SHOCK ABSORBER

(71) Applicant: Showa Corporation, Gyoda-shi (JP)

(72) Inventors: Yosuke Murakami, Fukuroi (JP); Kazuhiro Miwa, Fukuroi (JP)

(73) Assignee: SHOWA CORPORATION, Gyoda-Shi (JP)

( * ) Notice: Subject to any disclaimer, the term of this patent is extended or adjusted under 35 U.S.C. 154(b) by 73 days.

(21) Appl. No.: 14/865,935

(22) Filed: Sep. 25, 2015

(65) Prior Publication Data

US 2016/0091044 A1    Mar. 31, 2016

(30) Foreign Application Priority Data

Sep. 30, 2014    (JP) ................ 2014-199703

(51) Int. Cl.
*F16F 9/34* (2006.01)
*F16F 9/18* (2006.01)
*F16F 9/46* (2006.01)

(52) U.S. Cl.
CPC ............ *F16F 9/34* (2013.01); *F16F 9/18* (2013.01); *F16F 9/465* (2013.01); *F16F 9/469* (2013.01)

(58) Field of Classification Search
CPC ............ F16F 9/465; F16F 9/466; F16F 9/34
See application file for complete search history.

(56) References Cited

U.S. PATENT DOCUMENTS

| | | | | |
|---|---|---|---|---|
| 2,637,414 A | * | 5/1953 | Patriquin | F16F 9/348 188/282.9 |
| 4,732,408 A | * | 3/1988 | Ohlin | F16F 9/465 188/266.2 |
| 4,907,680 A | * | 3/1990 | Wolfe | F16F 9/46 188/266.5 |
| 5,143,185 A | * | 9/1992 | Klein | F16F 9/465 188/266.5 |

(Continued)

FOREIGN PATENT DOCUMENTS

| | | |
|---|---|---|
| EP | 1983213 A | 10/2008 |
| JP | H11-315874 A | 11/1999 |

(Continued)

OTHER PUBLICATIONS

Extended European Search Report dated Apr. 4, 2016 for the corresponding European Patent Application No. 15187034.2.

(Continued)

*Primary Examiner* — Nicholas J Lane
(74) *Attorney, Agent, or Firm* — Leason Ellis LLP

(57) ABSTRACT

A damping-force generating device included in a shock absorber includes: a main valve that opens and closes for controlling a flow of oil (working fluid) caused by sliding of a piston in a cylinder and thereby generates a damping force; a first pressure chamber and a second pressure chamber separated by the main valve; a compression-side inlet check valve and an extension-side inlet check valve that allow only inflow of the oil into the first pressure chamber; and a compression-side outlet check valve and an extension-side (Continued)

outlet check valve that allow only outflow of the oil from the second pressure chamber. The first pressure chamber and the second pressure chamber are formed in a substantially double-ring structure.

8 Claims, 12 Drawing Sheets

(56) References Cited

U.S. PATENT DOCUMENTS

| | | | | | |
|---|---|---|---|---|---|
| 5,147,018 | A | * | 9/1992 | Kobori | E04B 1/98 188/300 |
| 5,244,063 | A | * | 9/1993 | Laurien | B60G 17/08 188/266.8 |
| 5,303,804 | A | * | 4/1994 | Spiess | F16F 9/465 188/266.5 |
| 5,501,307 | A | * | 3/1996 | Lars | F16F 9/465 188/266.8 |
| 6,311,812 | B1 | * | 11/2001 | Sonsterod | F16F 9/466 188/266.6 |
| 2005/0279597 | A1 | | 12/2005 | Yamaguchi | |
| 2014/0231199 | A1 | | 8/2014 | Kim et al. | |
| 2015/0276004 | A1 | * | 10/2015 | Murakami | F16F 9/512 188/313 |
| 2016/0369862 | A1 | * | 12/2016 | Miwa | F16F 9/464 |

FOREIGN PATENT DOCUMENTS

| | | |
|---|---|---|
| JP | 2000-186735 A | 7/2000 |
| JP | 2005-344911 A | 12/2005 |
| JP | 2007-010013 A | 1/2007 |

OTHER PUBLICATIONS

Office Action dated Jul. 3, 2018 for the corresponding Japanese Patent Application No. 2014-199703.

* cited by examiner

SHOCK ABSORBER

CROSS-REFERENCE TO RELATED APPLICATIONS

This application is based on and claims priority under 35 USC 119 from Japanese Patent Application No. 2014-199703 filed on Sep. 30, 2014, the entire content of which is incorporated herein by reference.

BACKGROUND

1. Technical Field

The present invention relates to a shock absorber including a damping-force generating device that controls a flow of working fluid caused by sliding of a piston in a cylinder and thereby generates a damping force.

2. Related Art

As a shock absorber used as a rear cushion that suspends a rear wheel of a motorcycle on a vehicle body, for example, there is a hydraulic shock absorber including a damping-force generating device that controls a flow of oil caused by sliding of a piston in a cylinder and thereby generates a damping force. Various techniques have been proposed concerning such a hydraulic shock absorber.

FIG. 11 is a longitudinal sectional view of a main part of a related-art shock absorber. As shown in FIG. 11, in a shock absorber 201, a part of a piston rod 203 is inserted from above into a cylinder 202 in which oil is sealed. A piston 204 is coupled to the lower end portion of the piston rod 203. The piston 204 is slidably fitted in the up-down direction on the inner circumference of the cylinder 202. An inside of the cylinder 202 is sectioned into a cylinder upper chamber S11 and a cylinder lower chamber S12 by the piston 204. A compression-side oil passage 205 and an extension-side oil passage 206 are formed in the piston 204. A main disk valve 207 that selectively opens and closes the compression-side oil passage 205 and a main disk valve 208 that selectively opens and closes the extension-side oil passage 206 are respectively formed on the upper and lower surfaces of the piston 204.

Flows of the oil caused in the compression-side oil passage 205, and the extension-side oil passage 206 by sliding of the piston 204 in the cylinder 202 are respectively controlled by the main disk valves 207 and 208, whereby a damping force is generated. The damping force is adjusted by controlling a valve opening pressure of the main disk valves 207 and 208. The valve opening pressure is controlled by an internal pressure of back pressure chambers 213 and 214 caused by a channel area difference between back pressure chamber inlet oil passages 211 and 212 respectively provided in valve members 209 and 210 and notch-like downstream side orifices 217 and 218 respectively formed in outer circumferences of relief valves 215 and 216.

FIG. 12 is a longitudinal sectional view of a damping force adjusting valve 310 connected to a related-art shock absorber 301 and a hydraulic circuit diagram of the entire shock absorber. In the shock absorber 301 shown in FIG. 12, a part of a piston rod 303 is inserted from above into a cylinder 302 in which oil is filled. A piston 304 is attached to the lower end portion of the piston rod 303. The piston 304 is slidably fitted in the up-down direction on the inner circumference of the cylinder 302. The inside of the cylinder 302 is sectioned into a cylinder upper chamber S11 and a cylinder lower chamber S12 by the piston 304.

The shock absorber 301 includes the damping force adjusting valve 310 connected via a hydraulic circuit including four check valves 305, 306, 307, and 308. The damping force adjusting valve 310 includes a slidable valve body 311, a valve seat 312 on which the valve body 311 is seated, and a spring 313 that urges the valve body 311 in a seating direction. The damping force can be adjusted by the single damping force adjusting valve 310 in both of a compression side stroke and an extension side stroke of the shock absorber 301.

That is, in the compression side stroke in which the piston 304 moves downward in the cylinder 302, the oil in the cylinder lower chamber S12 is compressed by the piston 304, and the pressure of the oil increases. The oil is supplied to the damping force adjusting valve 310 through the check valve 305 as indicated by solid line arrows in FIG. 12, whereby a compression side damping force is adjusted. The oil from the damping force adjusting valve 310 passes through the check valve 306 and flows into the cylinder upper chamber S11.

In the extension side stroke in which the piston 304 moves upward in the cylinder 302, the oil in the cylinder upper chamber S11 is compressed by the piston 304, and the pressure of the oil increases. The oil is supplied to the damping force adjusting valve 310 through the check valve 307 as indicated by broken line arrows in FIG. 12, whereby an extension side damping force is adjusted. The oil from the damping force adjusting valve 310 passes through the check valve 308 and flows into the cylinder lower chamber S12. Note that a capacity change in the cylinder 302 due to entry and exit of the piston rod 303 into and from the cylinder 302 in the compression side stroke and the extension side stroke is compensated by compression and expansion of gas in a reservoir 314.

However, in the shock absorber 201 shown in FIG. 11, the main disk valves 207 and 208 that respectively generate the compression side damping force and the extension side damping force and the back pressure chambers 213 and 214 for controlling the valve opening pressure of the main disk valves 207 and 208 are respectively provided. Therefore, the number of components increases, and the structure of the shock absorber 201 is complicated. A compact layout cannot be realized.

In the shock absorber 301 shown in FIG. 12, the single damping force adjusting valve 310 is used in common in both of the compression side stroke and the extension side stroke to adjust the damping force. However, arrangement for realizing a compact layout is not examined.

SUMMARY OF INVENTION

It is an object of the present invention to provide a shock absorber that can attain simplification of structure and compactness of a layout of a damping-force generating device that generates an appropriate damping force.

A shock absorber in an embodiment includes: a cylinder in which working fluid is sealed; a piston that is slidably fitted into the cylinder; a piston rod that is coupled to the piston and extends to an outside of the cylinder; and a damping-force generating device that controls a flow of the working fluid in a compression side stroke and an extension side stroke generated by sliding of the piston in the cylinder, thereby generating a damping force. The damping-force generating device includes: a main valve that opens and closes for controlling the flow of the working fluid caused by the sliding of the piston in the cylinder, thereby generating a damping force; a first pressure chamber and a second pressure chamber separated by the main valve; a compression-side inlet check valve and an extension-side inlet check valve that allow only inflow of the working fluid into the first pressure chamber; and a compression-side outlet check valve and an extension-side outlet check valve that allow only outflow of the working fluid from the second pressure chamber. The first pressure chamber and the second pressure chamber are formed in a substantially double-ring structure.

DESCRIPTION OF EMBODIMENTS

An embodiment of the present invention is explained below with reference to the drawings.

Structure of a Shock Absorber

Figure 1:
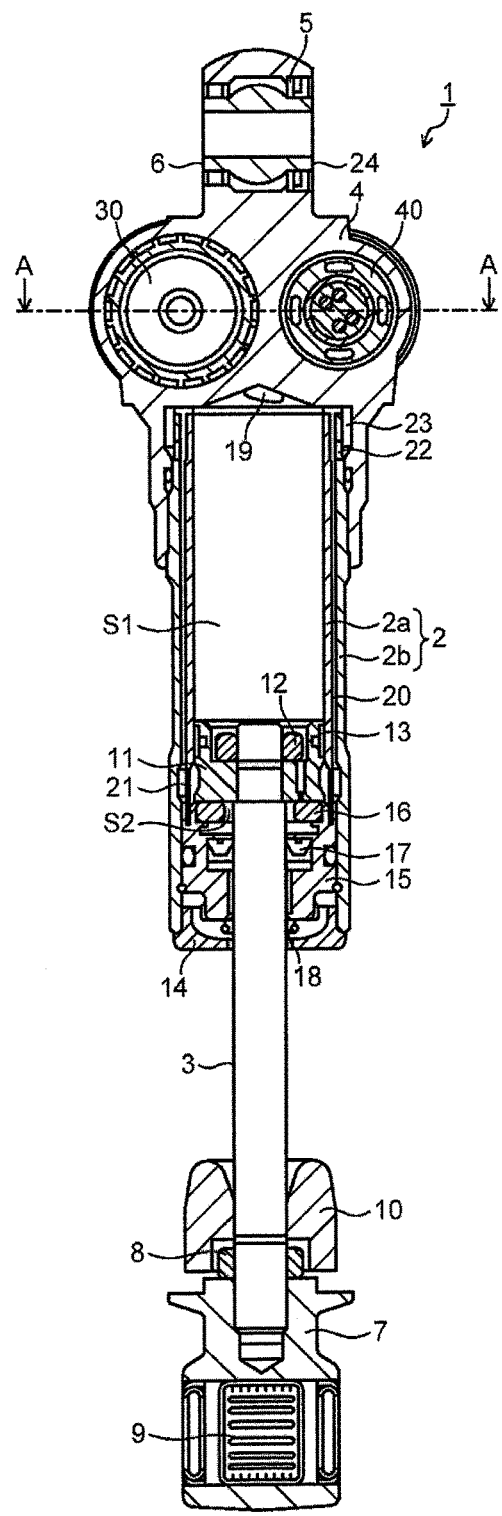
FIG. 1 is a longitudinal sectional view of a shock absorber in an embodiment.
Figure 2:
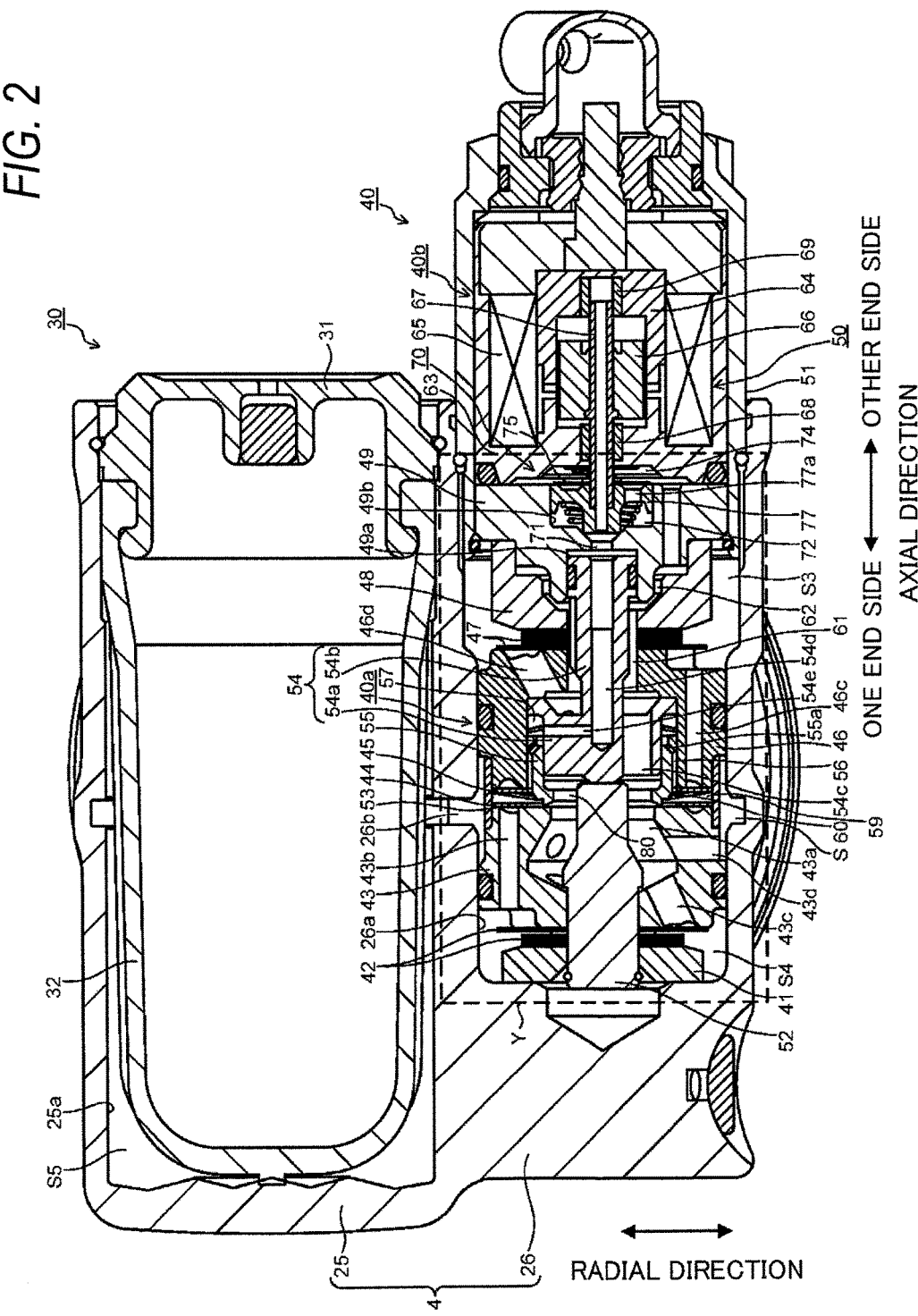
FIG. 2 is an A-A sectional view of Part Y in FIG. 1.
Figure 3:
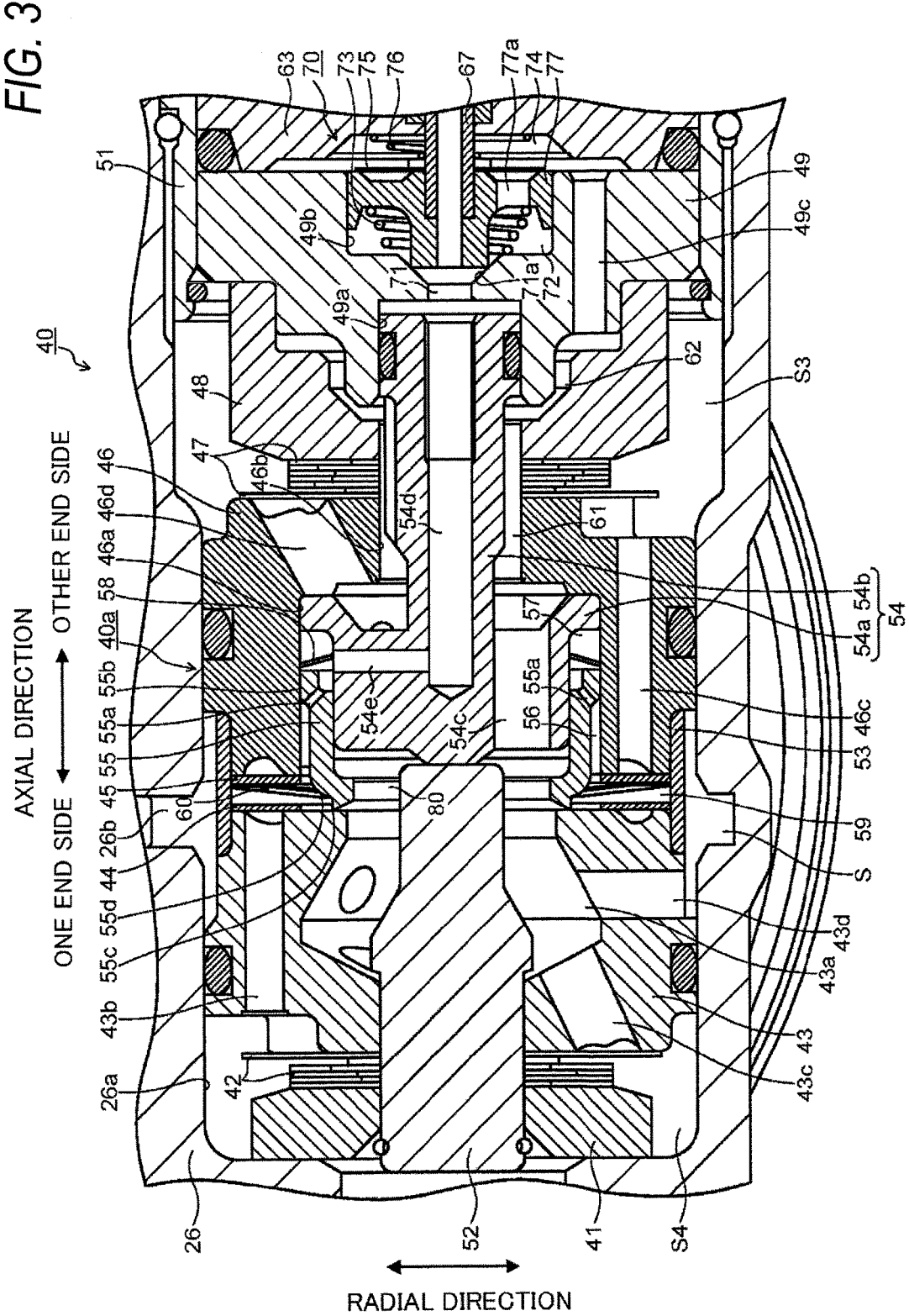
FIG. 3 is an enlarged detailed view of FIG. 2.

FIG. 1 is a longitudinal sectional view of a shock absorber 1 in the embodiment. FIG. 2 is an A-A sectional view of FIG. 1. FIG. 3 is an enlarged detailed view of Part Y in FIG. 2.

The shock absorber 1 in the embodiment is an inverted rear cushion that suspends a rear wheel of a motorcycle on a vehicle body. In the shock absorber 1, as shown in FIG. 1, a part of a piston rod 3 attached to an axle side is inserted from below into an inside of a cylinder 2 attached to a vehicle body side. A not-shown suspension spring is interposed between the cylinder 2 and the piston rod 3.

The cylinder 2 is configured by an inner cylinder 2a and an outer cylinder 2b that form a concentric double tube. A damper case section 4 is attached to an upper end portion of the cylinder 2. A reservoir 30 and a damping-force generating device 40 explained below are provided in the damper case section 4. A part of the damper case section 4 configures a vehicle-body-side attaching section 24. A cylindrical rubber bush 5 is inserted through the vehicle-body-side attaching section 24 in a lateral direction (a left-right direction in FIG. 1) and held. A substantially cylindrical collar 6 is inserted through an inner side of the rubber bush 5 in the lateral direction and held. The upper end portion of the cylinder 2 is attached to the vehicle body of the motorcycle by a shaft inserted through the collar 6 inserted through the vehicle-body-side attaching section 24 and held.

An axle-side attaching member 7 is screwed on the lower end portion of the piston rod 3. Further, the axle-side attaching member 7 is firmly fixed by a lock nut 8. A lower end portion of the piston rod 3 is attached to a rear-wheel supporting member of the motorcycle via a shaft inserted through a cylindrical collar 9 inserted through the axle-side attachment member 7 in the lateral direction (the left-right direction in FIG. 1) and held. Note that, directly above the axle-side attachment member 7 at the lower end portion of the piston rod 3, a bump rubber 10 for preventing bottoming of the shock absorber 1 in a most compressed state is inserted through the piston rod 3 and fixed.

A piston 11 is attached to an upper end portion of the piston rod 3, which faces an inside of the inner cylinder 2a of the cylinder 2, by a nut 12. The piston 11 is slidably fitted into the up-down direction on an inner circumference of the inner cylinder 2a via a piston ring 13 held on an outer circumference of the piston 11.

A space in the inner cylinder 2a of the cylinder 2 is sectioned into a piston-side oil chamber S1 on an upper side and a rod-side oil chamber S2 on a lower side by the piston 11. Oil, which is working fluid, is filled in the piston-side oil chamber S1 and the rod-side oil chamber S2.

As shown in FIG. 1, a cap 14 is attached to a portion through which the piston rod 3 is inserted in a lower surface opening section of the outer cylinder 2b of the cylinder 2. A rod guide 15, through a center of which the piston rod 3 slidably pierces in the up-down direction, is fitted to an inner circumference of a lower end portion of the outer cylinder 2b. A rebound rubber 16 is fitted to an inner circumference of an upper end opening section of the rod guide 15. An oil seal 17 is fitted to an inner circumference of an intermediate portion of the rod guide 15. A dust seal 18 is fitted to an outer circumference of a lower end portion of the rod guide 15. Note that a leak of the oil from the cylinder 2 is prevented by seal action of the oil seal 17, and that intrusion of dust into the cylinder 2 is prevented by seal action of the dust seal 18.

In the damper case section 4, as shown in FIG. 1, an oil hole 19 opening to the piston-side oil chamber S1 formed in the inner cylinder 2a of the cylinder 2 is formed. The piston-side oil chamber S1 communicates with a first oil chamber S3 (see FIG. 2) of the damping-force generating device 40 via the oil hole 19. A cylindrical channel 20 is formed between the inner cylinder 2a and the outer cylinder 2b of the cylinder 2. A lower end of the channel 20 communicates with the rod-side oil chamber S2 via a plurality of oil holes 21 formed at a lower end portion of the inner cylinder 2a. On the other hand, an upper end of the channel 20 communicates with a second oil chamber S4 (see FIG. 2) of the damping-force generating device 40 via a plurality of oil holes 22 formed at an upper end of the outer cylinder 2b and a channel 23 formed between the damper case section 4 and the outer cylinder 2b.

In the shock absorber 1 in the embodiment, the damper case section 4 attached to an upper end of the cylinder 2 includes, as shown in FIG. 2, a damper case 25 and a damper case 26 and is provided on an outside of the cylinder 2. The reservoir 30 provided on an inside of the damper case 25 and the damping-force generating device 40 provided on an inside of the damper case 26 are provided in parallel. In FIG. 2, the damper case 25 and the damper case 26 are configured as a unit. However, not only this, but the damper case 25 and the damper case 26 may be separated.

The reservoir 30 includes, as shown in FIG. 2, a bag-like bladder 32 in a space defined by a bottomed cylindrical recess 25*a* of the damper case 25 and a chamber cap 31 attached to an opening section of the damper case 25. The bladder 32 is a member formed in a bag shape by an elastic body such as rubber and capable of expanding and contracting. An inner circumferential edge of an opening section of the bladder 32 is fitted to an outer circumference of the chamber cap 31 and held between the outer circumference of the chamber cap 31 and an inner circumference of the opening section of the damper case 25. Note that gas such as air is filled in an inside of the bladder 32. A space on an outside of the bladder 32 of the reservoir 30 configures a reservoir oil chamber S5. The oil, which is the working fluid, is filled in an inside of the reservoir oil chamber S5.

Details of a configuration of the damping-force generating device 40 are explained with reference to FIGS. 2 and 3.

The damping-force generating device 40 includes, as shown in FIG. 2, the bottomed cylindrical damper case 26 and a case 51, one end side of which is fitted to an inner circumference of an end opening section of the damper case 26. The damping-force generating device 40 sequentially includes a valve stopper 41, a compression-side outlet check valve 42, a valve seat member 43, an extension-side inlet check valve 44, a compression-side inlet check valve 45, a main valve member 46, an extension-side outlet check valve 47, a valve stopper 48, and a valve seat member 49 in the axial direction from one end side toward the other end side of a recess 26*a* of the damper case 26. In addition, the damping-force generating device 40 includes a rod 52 and a passage member 54 in a center of these members. Furthermore, the damping-force generating device 40 includes a solenoid section 50, which is an actuator, in the case 51 to be adjacent to the valve seat member 49. In the damping-force generating device 40 including the configuration explained above, a valve section 40*a* that generates a damping force and a back-pressure adjusting section 40*b* that adjusts the damping force generated by the valve section 40*a* are configured.

First, the valve section 40*a* is explained.

The valve section 40*a* includes, in order from one end side in the axial direction shown in FIG. 2, the compression-side outlet check valve 42, the valve seat member 43, the extension-side inlet check valve 44, a first pressure chamber PS1, the compression-side inlet check valve 45, a main valve 55, the main valve member 46, a distance collar 53, the extension-side outlet check valve 47, and a second pressure chamber PS2.

The rod 52 pierces through axis center sections of the valve stopper 41, the compression-side outlet check valve 42, and the valve seat member 43. The second oil chamber S4 sectioned by the valve seat member 43 is formed at an end portion on one end side in the recess 26*a* of the damper case 26. As explained above, the second oil chamber S4 communicates with the rod-side oil chamber S2 (see FIG. 1) via the channel 23, the oil holes 22, the channel 20, and the oil holes 21 (see FIG. 1).

In the valve seat member 43, a concave space 43*a* opening on the other end side is formed. In the valve seat member 43, a plurality of oil holes 43*b* piercing through in the axial direction, a plurality of oblique oil holes 43*c* opening to the space 43*a*, and a plurality of oil holes 43*d* in a radial direction opening to the space 43*a* are formed. The oil holes 43*b* are selectively opened and closed by the extension-side inlet check valve 44, and the oil holes 43*c* are selectively opened and closed by the compression-side outlet check valve 42. The compression-side outlet check valve 42 is formed by stacking a plurality of disk valves. The oil holes 43*d* are opened to an annular oil chamber S sectioned by the valve seat member 43, the main valve member 46, and the cylindrical distance collar 53 fitted between the valve seat member 43 and the main valve member 46 in the recess 26*a* of the damper case 26. The oil chamber S communicates with the reservoir oil chamber S5 of the reservoir 30 via a communication path 26*b* formed in the damper case 26.

On the inside of the main valve member 46, as shown in FIG. 3, recesses 46*a* and 46*b* having large and small different diameters are formed. The columnar passage member 54 having large and small different diameters is housed in the recesses 46*a* and 46*b*. The substantially cylindrical main valve 55, the other end of which projects to an outer circumferential side, is fitted to an outer circumference of a large-diameter section 54*a* of the passage member 54 slidably in the axial direction.

An outer circumference of the other end of the main valve 55 is slidably fitted to an inner circumference of the recess 46*a* on the large-diameter side of the main valve member 46. An annular channel 56 is formed between an outer circumference of the main valve 55 and the inner circumference of the recess 46*a* on the large-diameter side of the main valve member 46. The main valve 55 opens and closes to thereby control a flow of the oil caused by sliding of the piston 11 in the cylinder 2 and thereby generate a damping force. In the shock absorber 1 in the embodiments, the main valve 55 is formed in a substantially cylindrical shape. The main valve 55 opens a gap between the main valve 55 and the valve seat member 43 by the main valve 55 being spaced from the valve seat member 43 to the other end side in the axial direction and the main valve 55 closes the gap therebetween by the main valve 55 being seated on the valve seat member 43 at one end side in the axial direction, which enable circulation of the oil from a gap 59 to a gap 80. Therefore, in the main valve 55, an outer circumference of a seating section 55*c* on one end side needs to be present further radially inwardly than the outer circumference of a guide surface 55*b* on the other end side slid by the recess 46*a* of the main valve member 46 such that the main valve 55 is capable of opening to the other end side in the axial direction. That is, in the main valve 55, an outer circumference on one end side in the axial direction is present further radially inwardly than an outer circumference on the other end side in the axial direction. Consequently, a lower surface 55*d* forms a part of a pressure receiving area for the hydraulic pressure of the gap 59, which is the first pressure chamber PS1, and thus the main valve 55 receives a valve opening pressure to the other end side in the axial direction.

In the main valve member 46, an oil hole 46*c* piercing through in the axial direction and an oblique oil hole 46*d* are formed. In the large-diameter section 54*a* of the passage member 54, an oil hole 54*c* piercing through in the axial direction is formed. In a small-diameter section 54*b* of the passage member 54, an oil hole 54*d* extending in the axial direction is formed. In the large-diameter section 54*a* of the passage member 54, an oil hole 54*e* extending from the oil hole 54*d* outward in the radial direction and opening to a pilot chamber 57 explained below is formed.

In an intermediate portion in the axial direction in the recess 26*a* of the damper case 26, the annular first oil chamber S3 defined by the main valve member 46, the valve stopper 48, and the valve seat member 49 is formed.

As explained above, the gap 59 is formed in a space surrounded by the distance collar 53, the valve seat member 43, the main valve member 46, and the main valve 55. The extension-side inlet check valve 44 and the compression-side inlet check valve 45 are provided in the gap 59. The extension-side inlet check valve 44 and the compression-side inlet check valve 45 are urged by a leaf spring 60, which is interposed between the extension-side inlet check valve 44 and the compression-side inlet check valve 45, in directions for respectively closing the oil holes 43b of the valve seat member 43 and the oil hole 46c of the main valve member 46. Note that the oil holes 43b of the valve seat member 43 are always opened to the second oil chamber S4, and that the oil hole 46c of the main valve member 46 is always opened to the first oil chamber S3.

The oil hole 46d obliquely formed in the main valve member 46 communicates with the oil hole 54c of the passage member 54 and is selectively opened and closed by the extension-side outlet check valve 47.

On an outer circumferential side of the small-diameter section 54b of the passage member 54, a channel 61 formed among the main valve member 46, the extension-side outlet check valve 47, and the valve stopper 48 extends in the axial direction. The channel 61 communicates with a step-like channel 62 formed between the valve stopper 48 and the valve seat member 49.

As shown in FIG. 3, the first pressure chamber PS1 is formed by the gap 59 and the channel 56. On the other hand, the second pressure chamber PS2 includes the gap 80 formed by the valve seat member 43, the passage member 54, the main valve 55, and the rod 52, the oil holes 43c, the space 43a, the oil hole 54c, the channel 61, the oil hole 46d, the channel 62, an oil hole 49c, a space 74, an oil hole 77a, and a space 72. The first pressure chamber PS1 and the second pressure chamber PS2 are separated by the main valve 55. The compression-side inlet check valve 45 and the extension-side inlet check valve 44 allow only inflow of the oil into the first pressure chamber PS1. The compression-side outlet check valve 42 and the extension-side outlet check valve 47 allow only outflow of the oil from the second pressure chamber PS2. The first pressure chamber PS1 and the second pressure chamber PS2 are formed in a substantially double-ring structure. In the shock absorber 1 in the embodiments, the first pressure chamber PS1 is on an outer annular side and the second pressure chamber PS2 is on an inner annular side. However, not only this, but in the structure in which the first pressure chamber PS1 and the second pressure chamber PS2 are formed in the substantially double-ring structure, the first pressure chamber PS1 may be on the inner annular side, and the second pressure chamber PS2 may be on the outer annular side. Note that, the oil hole 49c, the space 74, the oil hole 77a, and the space 72 are explained more in detail below.

Next, the back-pressure adjusting section 40b is explained.

The back-pressure adjusting section 40b includes an oil hole 55a of the main valve 55, the pilot chamber 57, a leaf spring 58, the passage member 54, the valve stopper 48, an oil hole 71 of the valve seat member 49, and a damping-force adjusting section 70.

The oil hole 55a is formed in the main valve 55 and allows the channel 56 formed on the outer circumference of the main valve 55 and the pilot chamber 57 to communicate with each other. The pilot chamber 57 has an annular shape and is formed by being sectioned by the main valve 55 and the large-diameter section 54a of the passage member 54 on a rear side (the other end side in FIG. 3) of the main valve 55 in the recess 46a on the large-diameter side of the main valve member 46. The leaf spring 58 is housed in the pilot chamber 57 and urges the main valve 55 to a valve closing side (a side on which the seating section 55c on one end side of the main valve 55 is seated on an end face of the valve seat member 43). The pilot chamber 57 causes an internal pressure in a valve closing direction to act on the main valve 55 with a pressure of the oil branching from the first pressure chamber PS1.

The small-diameter section 54b of the passage member 54 pierces through the axis center portions of the main valve member 46, the extension-side outlet check valve 47, and the valve stopper 48 and fits in a recess 49a of the valve seat member 49. Note that, on an outer circumference side of the small-diameter section 54b of the passage member 54, the channel 61 is formed as explained above.

The damping-force adjusting section 70 includes, as shown in FIGS. 2 and 3, the valve seat member 49, a spring 73, a valve body 77, a check valve 75, a spring 76, and the solenoid section 50. The valve body 77 and the check valve 75 function as a damping force adjusting valve. For example, when the valve body 77 is seated on the valve seat member 49, the valve body 77 functions as the damping force adjusting valve. For example, when the valve body 77 is spaced from the valve seat member 49, the valve body 77 and the check valve 75 function as the damping force adjusting valve. In this case, the damping force is adjusted mainly by the valve body 77. For example, when the valve body 77 is spaced from the valve seat member 49 and the other end side of the valve body 77 moves to a valve opening direction most, the check valve 75 functions as the damping force adjusting valve. In any case, the damping force adjusting valve including the valve body 77 and the check valve 75 is provided on a pilot channel explained below and adjusts the internal pressure of the pilot chamber 57.

The solenoid section 50 included in the damping-force adjusting section 70 includes, as shown in FIG. 2, a core 63, an actuation rod 67, a plunger 66, a coil 65, and a core 64.

The solenoid section 50 is configured by housing the two bottomed cylindrical cores 63 and 64, the annular coil 65, the plunger 66 housed on an inside of the cores 63 and 64, the hollow actuation rod 67 that pierces through an axial center portion of the plunger 66, and the like on an inside of the cylindrical case 51. Both the end portions in the axial direction of the actuation rod 67 are supported to be movable in the axial direction by cylindrical guide bushes 68 and 69. The valve body 77 is attached to an outer circumference on one end side of the actuation rod 67, which faces an inside of a recess 49b of the valve seat member 49.

As shown in FIG. 3, the valve body 77 is fitted in an inner circumference of the recess 49b of the valve seat member 49 to be movable in the axial direction. The valve body 77 is selectively seated on a taper-like valve seat 71a of the oil hole 71 formed in the axial center portion of the valve seat member 49 to thereby open and close the oil hole 71. In the recess 49b of the valve seat member 49, the space 72 sectioned by the valve body 77 is formed. In the space 72, the spring 73 that urges the valve body 77 in the valve opening direction (the other end side in FIG. 3) is housed. The space 72 formed in the valve seat member 49 communicates with the pilot chamber 57 via the oil hole 71 of the valve seat member 49, the oil holes 54d and 54e of the passage member 54. The oil hole 77a is pierced through the valve body 77. The oil hole 77a is always opened to the space 72.

On an end face on one end side of the core 63 of the solenoid section 50, the step-like concave space 74 is formed between the end face and the valve seat member 49. In the space 74, the check valve 75 that selectively opens and closes the oil hole 77a of the valve body 77 is provided. The check valve 75 is held on an outer circumference of the actuation rod 67 slidably in the axial direction and is urged in the valve closing direction (one end side in FIG. 3) by the spring 76 housed in the space 74.

In the damping-force generating device 40 configured as explained above, the oil hole 46c of the main valve member 46, the gap 59, the gap 80, and the space 43a and the oil hole 43c of the valve seat member 43 configure a main channel during the compression side stroke. In the main channel of the compression side stroke, the compression-side inlet check valve 45, the main valve 55, and the compression-side outlet check valve 42 are provided. On the other hand, the oil holes 43b formed in the valve seat member 43, the gap 59, the gap 80, the oil hole 54c formed in the passage member 54, and the oil hole 46d formed in the main valve member 46 configure a main channel during the extension side stroke. In the main channel of the extension side stroke, the extension-side inlet check valve 44, the main valve 55, and the extension-side outlet check valve 47 are provided.

A pilot channel during the compression side stroke includes an upstream-side pilot channel and a downstream-side pilot channel. The upstream-side pilot channel is configured by the oil hole 55a, the pilot chamber 57, the oil hole 54e, the oil hole 54d, and the oil hole 71. The downstream-side pilot channel is configured by the space 72, the oil hole 77a, the space 74, the oil hole 49c, the channel 62, and the channel 61. When the valve body 77 is spaced from the valve seat 71a, the valve body 77 is interposed in the pilot channel. Note that a portion including the space 72, the oil hole 77a, the space 74, the oil hole 49c, the channel 62, and the channel 61 of the downstream-side pilot channel also functions as a part of the second pressure chamber PS2.

A pilot channel during the extension side stroke includes the upstream-side pilot channel and the downstream-side pilot channel as during the compression side stroke. The upstream-side pilot channel is configured by the oil hole 55a, the pilot chamber 57, the oil hole 54e, the oil hole 54d, and the oil hole 71. The downstream-side pilot channel is configured by the space 72, the oil hole 77a, the space 74, the oil hole 49c, the channel 62, and the channel 61. When the valve body 77 is spaced from the valve seat 71a, the valve body 77 is interposed in the pilot channel. Note that a portion including the space 72, the oil hole 77a, the space 74, the oil hole 49c, the channel 62, and the channel 61 of the downstream-side pilot channel also functions as a part of the second pressure chamber PS2.

The schematic configuration of the damping-force generating device 40 is explained with reference to FIGS. 4 and 5.

Figure 4:
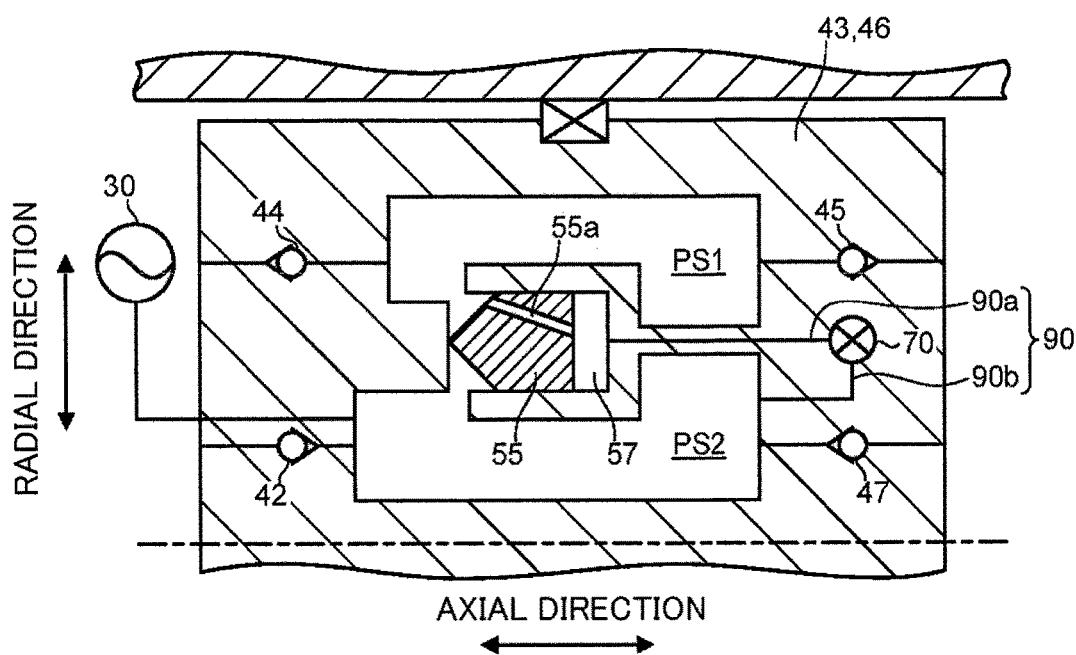
FIG. 4 is a schematic diagram showing the schematic configuration of a damping-force generating device of the shock absorber in the embodiment.

FIG. 4 is a schematic diagram showing the schematic configuration of the damping-force generating device of the shock absorber 1 in the embodiment. FIG. 5 is a hydraulic circuit diagram of the shock absorber 1 in the embodiment. Note that, in FIG. 4, the pilot channel is denoted by reference numeral 90, the upstream-side pilot channel constituting the pilot channel is denoted by reference sign 90a, and the downstream-side pilot channel constituting the pilot channel is denoted by reference sign 90b. An alternate long and short dash line shown in FIG. 4 is a center line in the axial direction of the damping-force generating device 40.

As shown in FIG. 4, in the damping-force generating device 40 of the shock absorber 1 in the embodiment, on an inside of the valve seat member 43 and the main valve member 46, the annular first pressure chamber PS1 is formed on a radially outer side (an outer ring side) of the valve seat member 43 and the main valve member 46 with the main valve 55 serving as the boundary. The annular second pressure chamber PS2 is formed on a radially inner side (an inner ring side) of the first pressure chamber PS1 with the main valve 55 serving as the boundary. The first pressure chamber PS1 and the second pressure chamber PS2 form a substantially double-ring structure and overlap each other in the radial direction. However, not only this, but in a structure in which the first pressure chamber PS1 and the second pressure chamber PS2 are the substantially double-ring structure, the first pressure chamber PS1 may be on the inner ring side, and the second pressure chamber PS2 may be on the outer ring side.

As explained above, the first pressure chamber PS1 is configured by the gap 59 and the channel 56 (see FIGS. 2 and 3). As explained above, the second pressure chamber PS2 is configured by the oil holes 43c, the space 43a, the gap 80, the oil hole 54c, the channel 61, the oil hole 46d, the channel 62, the oil hole 49c, the space 74, the oil hole 77a, and the space 72 (see FIGS. 2 and 3). The compression-side inlet check valve 45 and the extension-side inlet check valve 44 that allow only the inflow of the oil into the first pressure chamber PS1 in the compression side stroke and the extension side stroke are connected to the first pressure chamber PS1. The compression-side outlet check valve 42 and the extension-side outlet check valve 47 that allow only the outflow of the oil from the second pressure chamber PS2 in the compression side stroke and the extension side stroke are connected to the second pressure chamber PS2.

As shown in FIG. 4, the pilot channel 90 extended from the oil hole 55a via the pilot chamber 57 is connected to the second pressure chamber PS2. Note that, as explained above, the downstream-side pilot channel 90b also functions as a part of the second pressure chamber PS2. The damping-force adjusting section 70 is interposed in the pilot channel 90. The reservoir 30 is connected to the second pressure chamber PS2. Note that the pilot chamber 57 communicates with the first pressure chamber PS1 via the oil hole 55a formed in the main valve 55.

Figure 5:
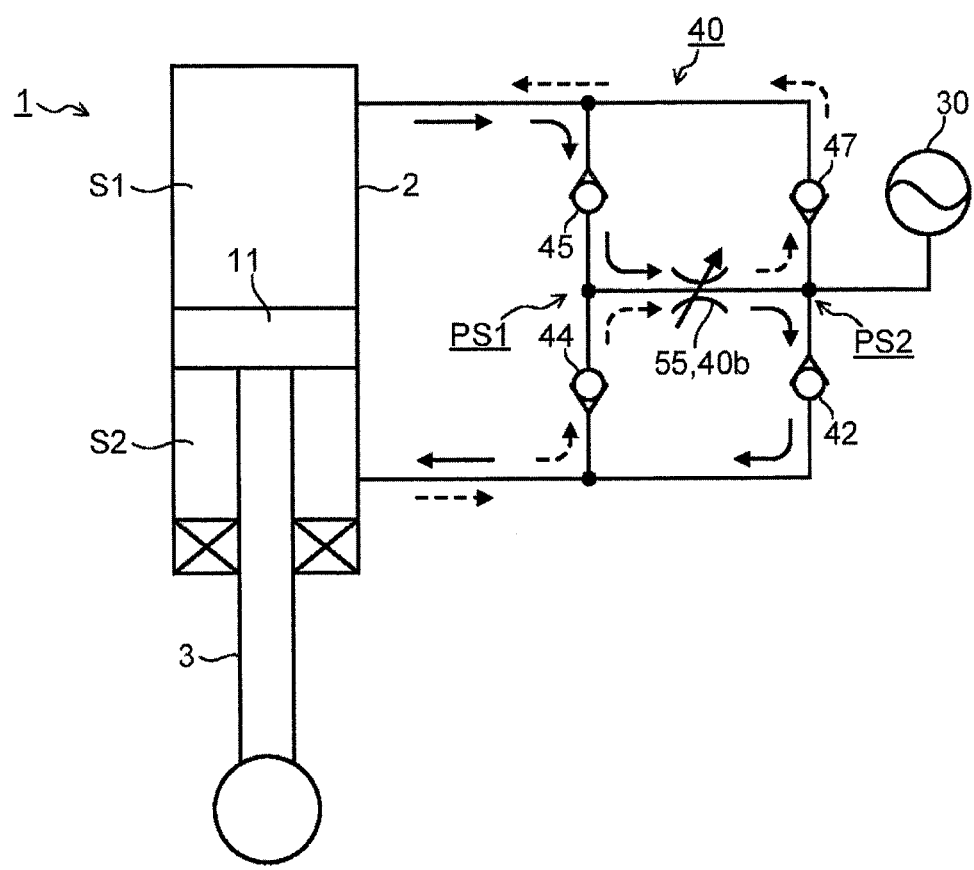
FIG. 5 is a hydraulic circuit diagram of the shock absorber in the embodiment.

A hydraulic circuit includes, as shown in FIG. 5, the main valve 55, the back-pressure adjusting section 40b, the compression-side inlet check valve 45, the compression-side outlet check valve 42, the extension-side inlet check valve 44, the extension-side outlet check valve 47, and the reservoir 30. Note that, in FIG. 5, components same as the components explained above are denoted by the same reference numerals and signs. The main valve 55, the compression-side inlet check valve 45, the compression-side outlet check valve 42, the extension-side inlet check valve 44, the extension-side outlet check valve 47, the first pressure chamber PS1, and the second pressure chamber PS2 are included in the valve section 40a. Note that, in the hydraulic circuit, the damping-force generating device 40 and the reservoir 30 are provided on an outside of the piston 11 and further on an outside of the cylinder 2.

The reservoir 30 communicates with an oil path divided on a downstream side of the main valve 55 and the back-pressure adjusting section 40b. In this way, the oil path communicating with the reservoir 30 is divided on the downstream side of the main valve 55 and the back-pressure adjusting section 40b. Consequently, the oil after being damped by the main valve 55 is led into the reservoir 30.

This makes it easy to perform adjustment for leading a predetermined amount of the oil into the reservoir 30.

In addition to that, the pressure of the rod-side oil chamber S2 substantially depends on only a pressure of a not-shown air chamber present in the reservoir 30 (a space on the inside of the bladder 32 shown in FIG. 2) and does not vary with setting of the channel resistance of the main valve 55. Therefore, it is possible to avoid a pause of a damping force during reversal from the compression side stroke to the extension side stroke. Incidentally, in FIG. 5, a flow of the oil during the compression side stroke is indicated by a solid line, and a flow of the oil during the extension side stroke is indicated by a broken line. Note that a flow of the oil in the hydraulic circuit shown in FIG. 5 is explained when action of the shock absorber is explained below.

Action of the Shock Absorber

Figure 6:
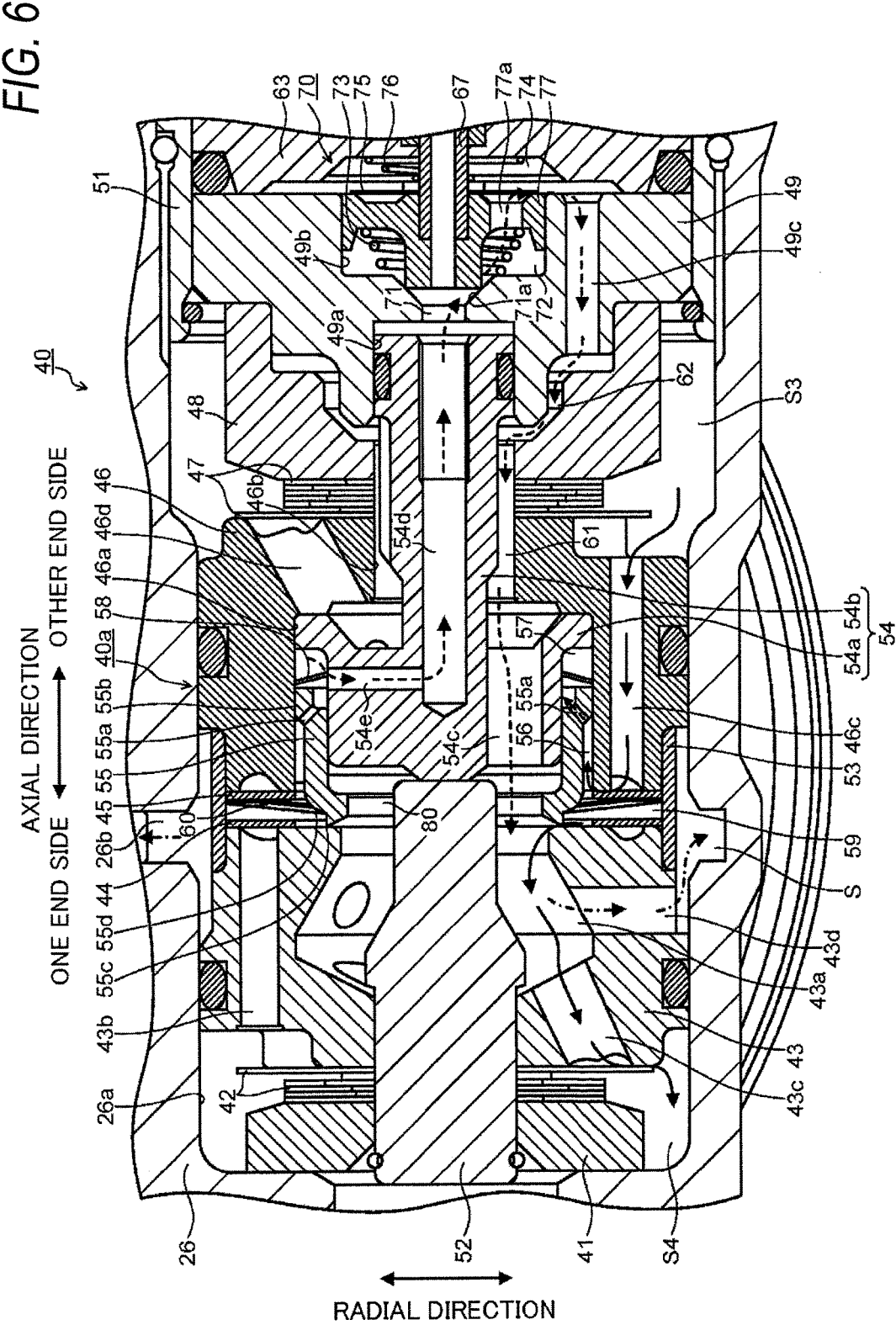
FIG. 6 is an enlarged detailed view of Part Y in FIG. 2 showing a flow of oil during a compression side stroke in the damping-force generating device of the shock absorber in the embodiment.
Figure 7:
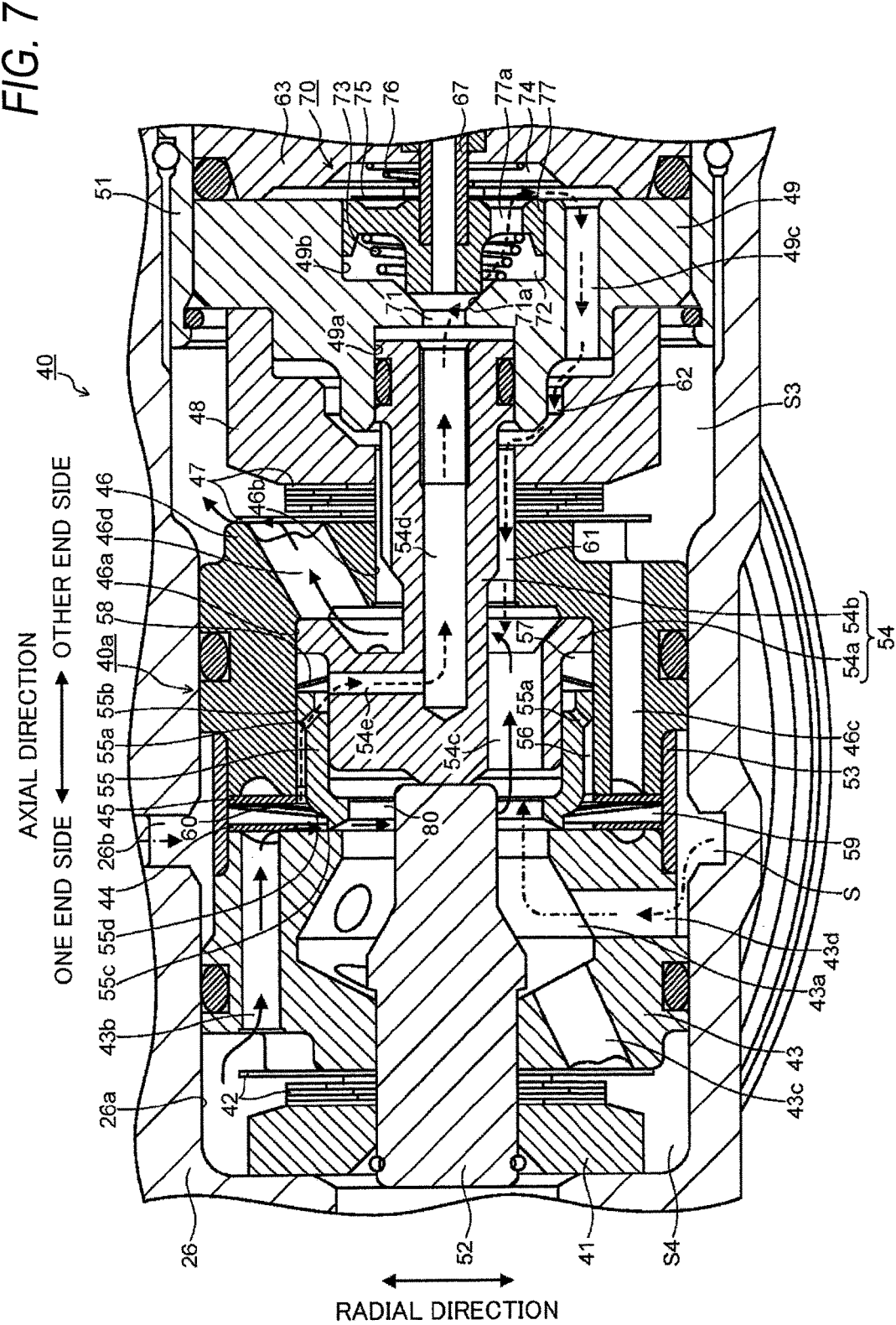
FIG. 7 is an enlarged detailed view of Part Y in FIG. 2 showing a flow of the oil during an extension side stroke in the damping-force generating device of the shock absorber in the embodiment.

The action of the shock absorber 1 configured as explained above during the compression side stroke and the extension side stroke is explained with reference to FIGS. 6 and 7. FIG. 6 is an enlarged detailed view of Part Y showing a flow of the oil during the compression side stroke in the damping-force generating device 40 of the shock absorber 1 in the embodiment. FIG. 7 is an enlarged detailed view of Part Y showing a flow of the oil during the extension side stroke in the damping-force generating device 40 of the shock absorber 1 in the embodiment.

(1-1) Compression Side Stroke

When the rear wheel moves up and down following unevenness of a road surface during traveling of the motorcycle, the cylinder 2 and the piston rod 3 of the shock absorber 1, which suspend the rear wheel, extend and contract. In the compression side stroke in which the piston rod 3 moves upward relatively to the cylinder 2, the oil in the piston-side oil chamber S1 is compressed by the piston 11 and the pressure in the piston-side oil chamber S1 increases. Then, the oil in the piston-side oil chamber S1 is supplied through the oil hole 19 shown in FIG. 1 to the first oil chamber S3 of the damping-force generating device 40 shown in FIGS. 2 and 3.

The oil supplied to the first oil chamber S3 of the damping-force generating device 40 passes through the main channel during the compression side stroke and flows into the second oil chamber S4. Specifically, as indicated by solid line arrows in FIG. 6, the oil passes through the oil hole 46c of the main valve member 46 from the first oil chamber S3, pushes the compression-side inlet check valve 45 open resisting an urging force of the leaf spring 60, and flows to the gap 59. When the oil flowed into the gap 59 flows through the gap between the main valve 55 and the valve seat member 43, the oil pushes the main valve 55 open resisting a force in the valve closing direction caused by the leaf spring 58 and a back pressure of the pilot chamber 57 and flows into the gap 80 and the space 43a of the valve seat member 43 from the gap 59.

The oil flowed into the space 43a passes through the oil hole 43c, pushes the compression-side outlet check valve 42 open, and flows into the second oil chamber S4. The oil flowed into the second oil chamber S4 flows into the rod-side oil chamber S2 from the second oil chamber S4 through the channel 23, the oil holes 22 formed in the outer cylinder 2b of the cylinder 2, the channel 20 between the inner cylinder 2a and the outer cylinder 2b, and the oil holes 21 formed in the inner cylinder 2a shown in FIG. 1. At this point, a main compression side damping force is generated in the shock absorber 1 by flow resistance caused when the oil passes through the main valve 55. The flow of the oil at this point is indicated by solid line arrows in the hydraulic circuit shown in FIG. 5. Note that, for example, by stacking a plurality of disk valves in the compression-side outlet check valve 42, a compression side damping force may be auxiliarily generated in the compression-side outlet check valve 42 in addition to the main compression side damping force generated in the main valve 55.

A part of the oil passed through the oil hole 46c of the main valve member 46 from the first oil chamber S3 and flowed into the gap 59 passes through the pilot channel and merges into the oil flowing through the main channel. Specifically, as indicated by broken line arrows in FIG. 6, a part of the oil passed through the oil hole 46c of the main valve member 46 from the first oil chamber S3 and flowed into the gap 59 passes through the oil hole 55a of the main valve 55 from the channel 56 on an outer circumferential side of the main valve 55 and flows into the pilot chamber 57.

The oil flowed into the pilot chamber 57 passes through the oil holes 54e and 54d of the passage member 54, the oil hole 71 of the valve seat member 49, and the gap between the valve body 77 and the valve seat 71a and flows into the space 72 of the valve seat member 49. The oil flowed into the space 72 of the valve seat member 49 passes through the oil hole 77a formed in the valve body 77, pushes the check valve 75 open resisting an urging force of the spring 76, and flows into the space 74 of the core 63. The oil flowed into the space 74 passes through the oil hole 49c of the valve seat member 49, the channels 62 and 61, and the oil hole 54c of the passage member 54 and merges into the oil flowing through the main channel.

Flow resistance of the oil passing through a gap between the valve body 77 and the valve seat 71a is adjusted by driving the solenoid section 50 and moving the actuation rod 67 and the valve body 77 attached to the actuation rod 67 in the axial direction to change the opening degree of the valve body 77. Consequently, it is possible to adjust an internal pressure of the upstream-side pilot channel configuring the channel from the oil hole 55a to the oil hole 71. It is also possible to adjust the internal pressure (the back pressure) of the pilot chamber 57 by adjusting the internal pressure of the upstream-side pilot channel. By adjusting the internal pressure (the back pressure) of the pilot chamber 57 in this way, it is possible to control a force pressing the main valve 55 in the valve closing direction and adjust the opening degree of the main valve 55. Consequently, it is possible to adjust a damping force generated by the flow resistance of the oil passing through the main valve 55. Specifically, if the opening degree of the valve body 77 is reduced, the internal pressure of the pilot chamber 57 increases, the opening degree of the main valve 55 is reduced, and the damping force increases. On the other hand, if the opening degree of the valve body 77 is increased, the internal pressure of the pilot chamber 57 decreases, the opening degree of the main valve 55 increases, and the damping force decreases.

In the compression side stroke, an amount of the oil equivalent to a volume of the piston rod 3 entering the inner cylinder 2a of the cylinder 2 passes through the oil holes 43d of the valve seat member 43 and flows into the oil chamber S as indicated by chain line arrows in FIG. 6. The oil flowed into the oil chamber S is supplied to the reservoir oil chamber S5 (see FIG. 2) of the reservoir 30 through the communication path 26b. Therefore, the bladder 32 of the reservoir 30 contracts, and the gas therein is compressed. According to compression of the gas, a capacity change in the inner cylinder 2a involved in entry of the piston rod 3 into the inner cylinder 2a of the cylinder 2 is compensated.

(1-2) Extension Side Stroke

Action during the extension side stroke of the shock absorber 1 is explained with reference to FIG. 7.

In the extension side stroke in which the piston rod 3 moves downward relatively to the cylinder 2, the piston 11 moves downward in the inner cylinder 2a of the cylinder 2 together with the piston rod 3. Therefore, the oil in the rod-side oil chamber S2 is compressed by the piston 11, and the pressure in the rod-side oil chamber S2 increases. Then, the oil in the rod-side oil chamber S2 is supplied to the second oil chamber S4 of the damping-force generating device 40 shown in FIGS. 2 and 3 through the oil holes 21 formed in the inner cylinder 2a, the channel 20 between the inner cylinder 2a and the outer cylinder 2b, and the oil holes 22 formed in the outer cylinder 2b and the channel 23 shown in FIG. 1.

The oil supplied to the second oil chamber S4 of the damping-force generating device 40 passes through the main channel during the extension side stroke and flows into the first oil chamber S3. Specifically, as indicated by solid line arrows in FIG. 7, the oil passes through the oil holes 43b of the valve seat member 43 from the second oil chamber S4, pushes the extension-side inlet check valve 44 open resisting the urging force of the leaf spring 60, and flows to the gap 59. The oil flowed into the gap 59 pushes the main valve 55 open resisting the force in the valve closing direction caused by the leaf spring 58 and the back pressure of the pilot chamber 57, passes through the gap 80, the oil hole 54c of the passage member 54, and the oil hole 46d of the main valve member 46 from the gap 59, pushes the extension-side outlet check valve 47 open, and flows into the first oil chamber S3.

The oil flowed into the first oil camber S3 passes through the oil hole 19 shown in FIG. 1 from the first oil chamber S3 and flows into the piston-side oil chamber 51. At this point, a main extension side damping force is generated in the shock absorber 1 by the flow resistance caused when the oil passes through the main valve 55. The flow of the oil at this point is indicated by broken line arrows in the hydraulic circuit shown in FIG. 5. Note that, for example, by stacking a plurality of disk valves in the extension-side outlet check valve 47, an extension side damping force may be auxiliarily generated in the extension-side outlet check valve 47 in addition to the main extension side damping force generated in the main valve 55.

A part of the oil passed through the oil holes 43b of the valve seat member 43 from the second oil chamber S4 and flowed into the gap 59 passes through the pilot channel from the channel 56 and merges into the oil flowing through the main channel. Specifically, as indicated by broken line arrows in FIG. 7, a part of the oil passed through the oil holes 43b of the valve seat member 43 from the second oil chamber S4 and flowed into the gap 59 passes through the oil hole 55a of the main valve 55 from the channel 56 on the outer circumferential side of the main valve 55 and flows into the pilot chamber 57.

The oil flowed into the pilot chamber 57 passes through the oil holes 54e and 54d of the passage member 54, the oil hole 71 of the valve seat member 49, and the gap between the valve body 77 and the valve seat 71a and flows into the space 72 of the valve seat member 49. The oil flowed into the space 72 of the valve seat member 49 passes through the oil hole 77a formed in the valve body 77, pushes the check valve 75 open resisting the urging force of the spring 76, and flows into the space 74 of the core 63. The oil flowed into the space 74 passes through the oil hole 49c of the valve seat member 49, the channels 62 and 61, and the oil hole 54c of the passage member 54 and merges into the oil flowing through the main channel.

As during the compression side stroke, the flow resistance of the oil passing through the gap between the valve body 77 and the valve seat 71a is adjusted by driving the solenoid section 50 and moving the actuation rod 67 and the valve body 77 attached to the actuation rod 67 in the axial direction to change the opening degree of the valve body 77. Consequently, it is possible to adjust the internal pressure of the upstream-side pilot channel configuring the channel from the oil hole 55a to the oil hole 71. It is also possible to adjust the internal pressure (the back pressure) of the pilot chamber 57 by adjusting the internal pressure of the upstream-side pilot channel. By adjusting the internal pressure (the back pressure) of the pilot chamber 57 in this way, it is possible to control the force for pressing the main valve 55 in the valve closing direction and adjust the opening degree of the main valve 55. Consequently, it is possible to adjust a damping force generated by the flow resistance of the oil passing through the main valve 55. Specifically, if the opening degree of the valve body 77 is reduced, the internal pressure of the pilot chamber 57 increases, the opening degree of the main valve 55 is reduced, and the damping force increases. On the other hand, if the opening degree of the valve body 77 is increased, the internal pressure of the pilot chamber 57 decreases, the opening degree of the main valve 55 increases, and the damping force decreases.

In the extension side stroke, an amount of the oil equivalent to the volume of the piston rod 3 exiting the inner cylinder 2a of the cylinder 2 passes through the communication path 26b from the reservoir oil chamber S5 of the reservoir 30 and flows into the oil chamber S as indicated by chain line arrows in FIG. 7. The oil flowed into the oil chamber S passes through the oil hole 43d and the space 43a of the valve seat member 43 and merges into the oil flowing through the main channel in the gap 80. The oil merged into the oil flowing through the main channel passes through the oil hole 54c of the passage member 54 and the oil hole 46d of the main valve member 46, pushes the extension-side outlet check valve 47 open, and flows into the first oil chamber S3. The oil flowed into the first oil chamber S3 is supplied to the piston-side oil chamber 51 through the oil hole 19 shown in FIG. 1. Therefore, the bladder 32 of the reservoir 30 expands, and the gas on the inside expands. According to the expansion of the gas, a capacity change in the inner cylinder 2a involved in an exit of the piston rod 3 from the inner cylinder 2a of the cylinder 2 is compensated.

Other Hydraulic Circuits

Figure 8:
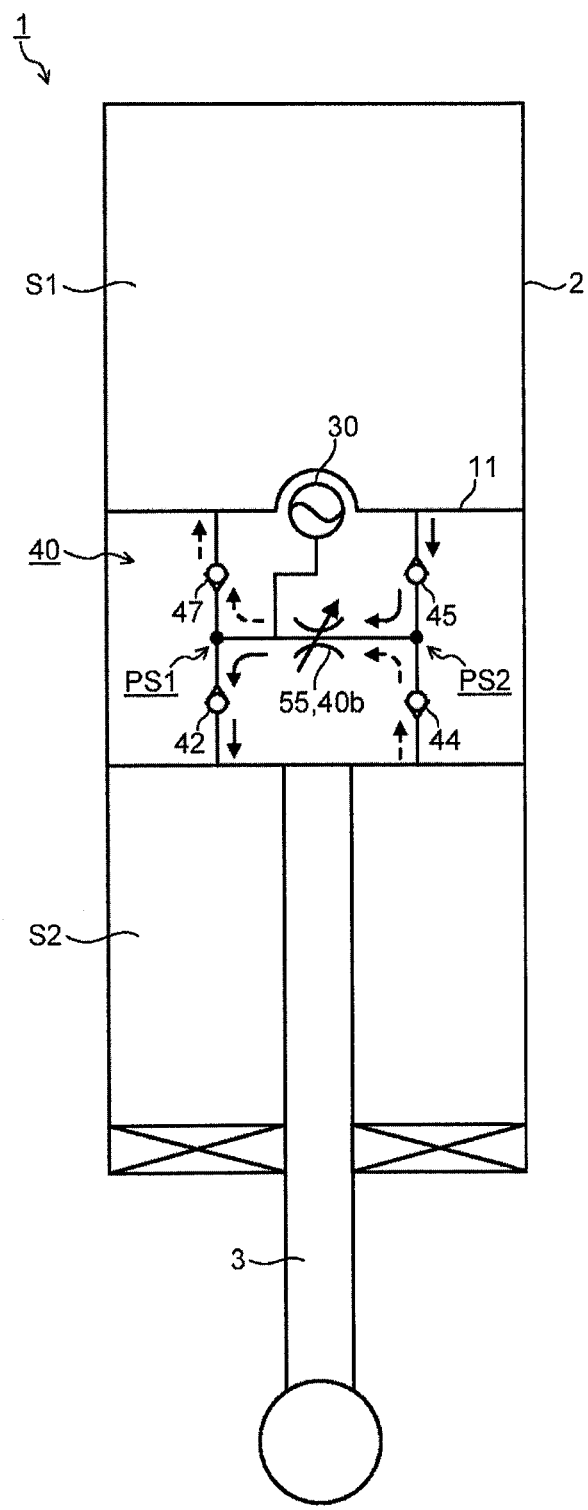
FIG. 8 is a hydraulic circuit diagram of another configuration in the shock absorber in the embodiment.
Figure 9:
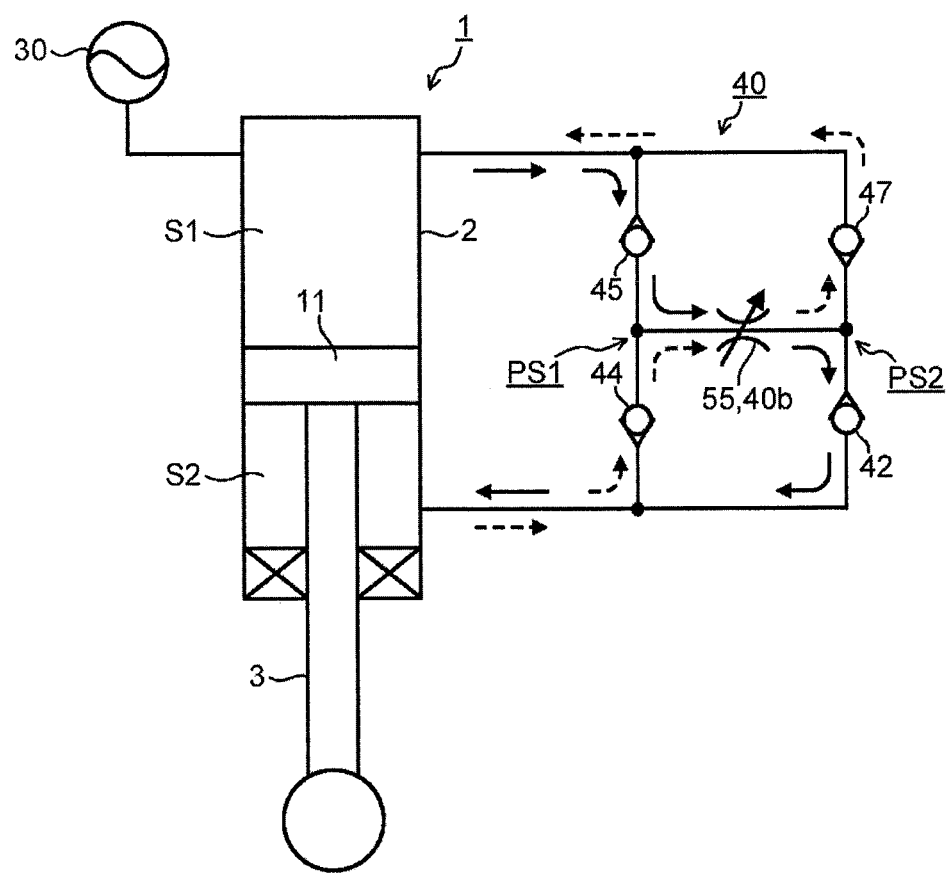
FIG. 9 is a hydraulic circuit diagram of still another configuration in the shock absorber in the embodiment.
Figure 10:
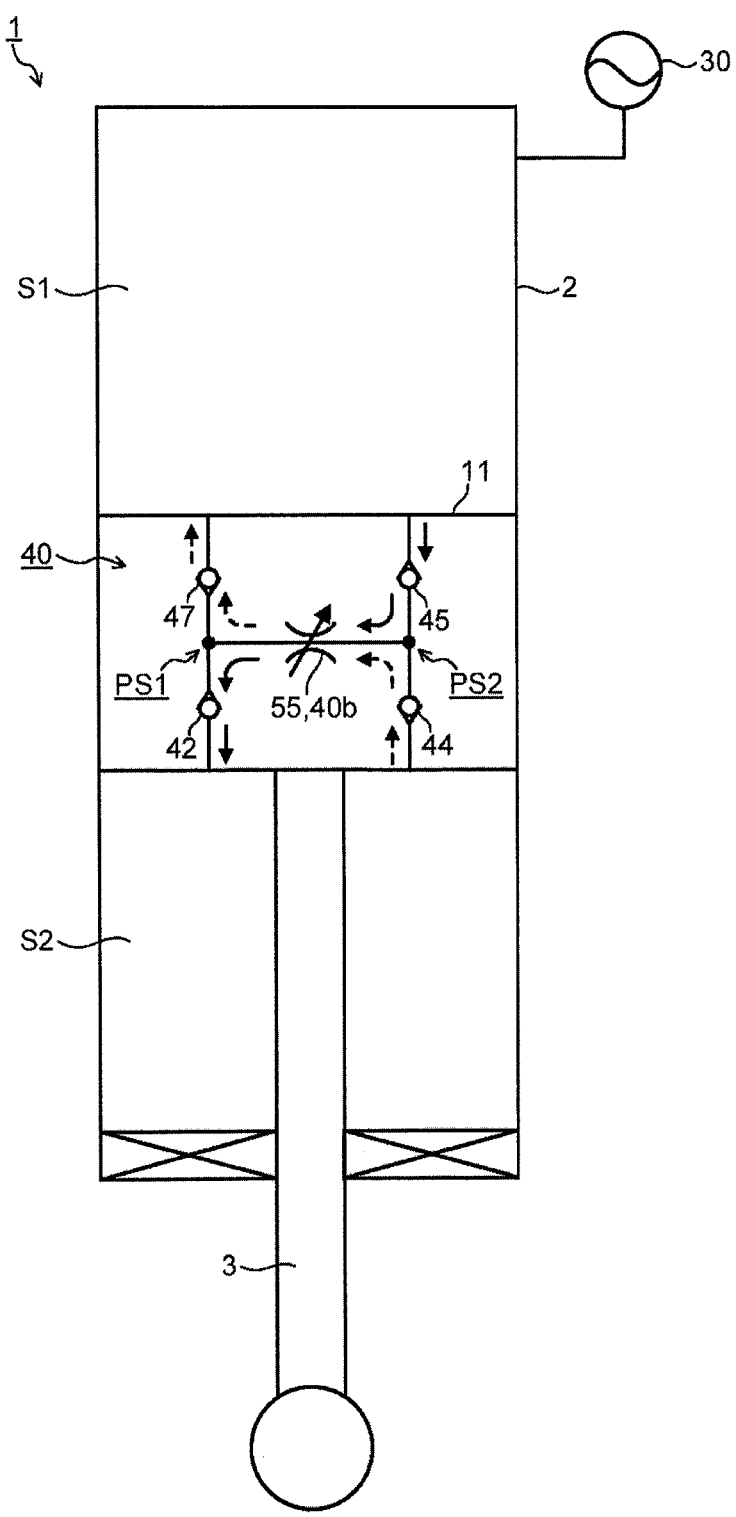
FIG. 10 is a hydraulic circuit diagram of yet another configuration in the shock absorber in the embodiment.
Figure 11:
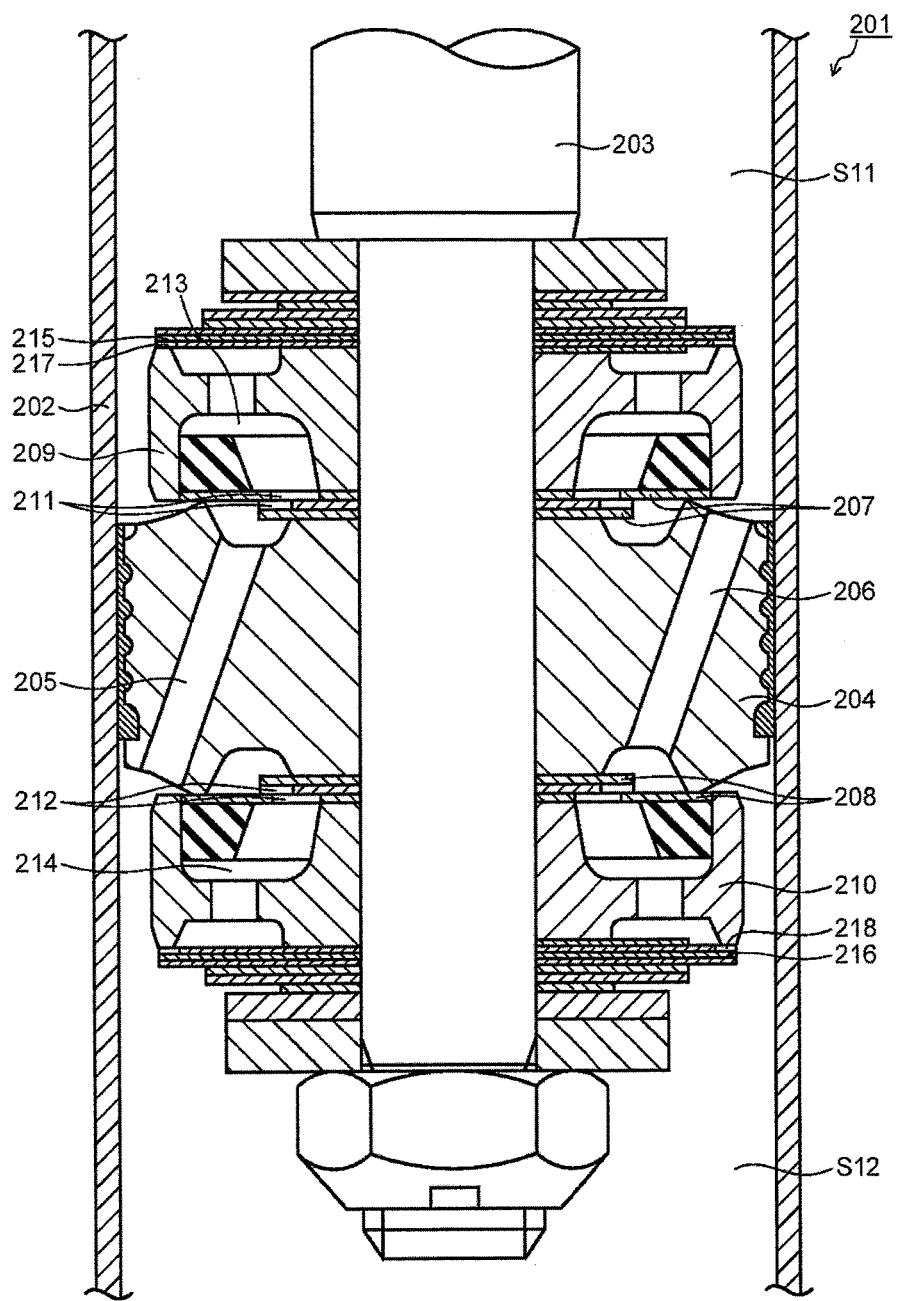
FIG. 11 is a longitudinal sectional view of a main part of a related-art shock absorber.
Figure 12:
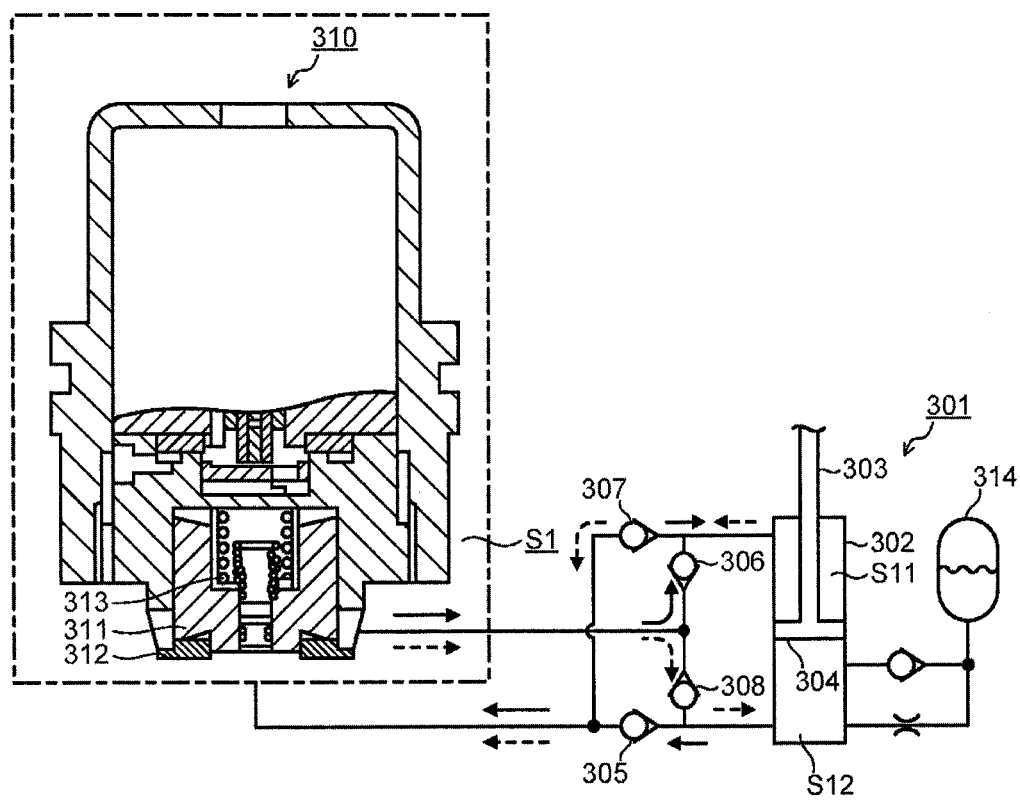
FIG. 12 is a longitudinal sectional view of a damping force adjusting valve connected to the related-art shock absorber and a hydraulic circuit diagram of the entire shock absorber.

In the shock absorber 1 in the present invention, the hydraulic circuit is not limited to the hydraulic circuit shown in FIG. 5. FIGS. 8 to 10 are hydraulic circuit diagrams of other configurations in the shock absorber 1 in the present invention. Note that components same as the components of the hydraulic circuit shown in FIG. 5 are denoted by the same reference numerals and signs and redundant explanation of the components is omitted or simplified. In FIGS. 8 to 10, a flow of the oil during the compression side stroke is indicated by solid lines and a flow of the oil during the extension side stroke is indicated by broken lines.

Hydraulic Circuit Shown in FIG. 8

The hydraulic circuit shown in FIG. 8 includes the main valve 55, the back-pressure adjusting section 40b, the compression-side inlet check valve 45, the compression-side outlet check valve 42, the extension-side inlet check valve 44, the extension-side outlet check valve 47, and the reservoir 30.

As shown in FIG. 8, functions of the hydraulic circuit may also be provided in the piston 11. That is, the damping-force generating device 40 and the reservoir 30 may be provided on the inside of the cylinder 2. However, not only this, but the reservoir 30 may be provided in the cylinder 2 and on the outside of the piston 11. The reservoir 30 may be provided on an inside of an axle-side attachment member 7 or a vicinity of the axle-side attachment member 7 via a channel piercing through the inside of the piston rod 3.

The reservoir 30 communicates with the oil path divided on the downstream side of the main valve 55 and the back-pressure adjusting section 40b. In this way, the oil path communicating with the reservoir 30 is divided on the downstream side of the main valve 55 and the back-pressure adjusting section 40b. Consequently, the oil after being damped by the main valve 55 is led into the reservoir 30. That is, the pressure of the rod-side oil chamber S2 substantially depends on only the pressure of the not-shown air chamber present in the reservoir 30 (the space on the inside of the bladder 32 shown in FIG. 2) and does not vary with setting of the channel resistance of the main valve 55. Therefore, it is possible to avoid a pause of a damping force during reversal from the compression side stroke to the extension side stroke.

(2-1) Compression Side Stroke

In the shock absorber 1 including such a hydraulic circuit, in the compression side stroke, a flow of the oil is indicated by solid line arrows in the hydraulic circuit shown in FIG. 8. Specifically, the oil in the piston-side oil chamber 51, the pressure of which increases because the piston rod 3 moves upward relatively to the cylinder 2, passes through the oil hole 46c of the main valve member 46, pushes the compression-side inlet check valve 45 open resisting the urging force of the leaf spring 60, and flows to the gap 59 (see FIG. 6).

The oil flowed into the gap 59 pushes the main valve 55 open resisting the force in the valve closing direction caused by the leaf spring 58 and the back pressure of the pilot chamber 57 and flows from the gap 59 to the gap 80 and the space 43a of the valve seat member 43. The oil flowed into the space 43a passes through the oil holes 43c, pushes the compression-side outlet check valve 42 open, and flows into the rod-side oil chamber S2. At this point, a main compression side damping force is generated in the shock absorber 1 by the flow resistance caused when the oil passes through the main valve 55. Note that, for example, by stacking a plurality of disk valves in the compression-side outlet check valve 42, a compression side damping force may be auxiliarily generated in the compression-side outlet check valve 42 in addition to the main compression side damping force generated in the main valve 55.

A part of the oil passed through the oil hole 46c of the main valve member 46 and flowed into the gap 59 passes through the pilot channel and merges into the oil flowing through the main channel. Specifically, as indicated by the broken line arrows in FIG. 6, a part of the oil passed through the oil hole 46c of the main valve member 46 from the first oil chamber S3 and flowed into the gap 59 passes through the oil hole 55a of the main valve 55 from the channel 56 on the outer circumferential side of the main valve 55 and flows into the pilot chamber 57.

The oil flowed into the pilot chamber 57 passes through the oil holes 54e and 54d of the passage member 54, the oil hole 71 of the valve seat member 49, and the gap between the valve body 77 and the valve seat 71a and flows into the space 72 of the valve seat member 49. The oil flowed into the space 72 of the valve seat member 49 passes through the oil hole 77a formed in the valve body 77, pushes the check valve 75 open resisting the urging force of the spring 76, and flows into the space 74 of the core 63. The oil flowed into the space 74 passes through the oil hole 49c of the valve seat member 49, the channels 62 and 61, and the oil hole 54c of the passage member 54, and merges into the oil flowing through the main channel.

Incidentally, in the compression side stroke, an amount of the oil equivalent to the volume of the piston rod 3 entering the inner cylinder 2a of the cylinder 2 is supplied to the reservoir 30 through the oil holes 43d of the valve seat member 43. Consequently, a capacity change in the inner cylinder 2a involved in an entry of the piston rod 3 into the inner cylinder 2a of the cylinder 2 is compensated.

(2-2) Extension Side Stroke

In the extension side stroke, a flow of the oil is indicated by the broken line arrows in the hydraulic circuit shown in FIG. 8. Specifically, the oil in the rod-side oil chamber S2, the pressure of which increases because the piston rod 3 moves downward relatively to the cylinder 2, passes through the oil holes 43b of the valve seat member 43, pushes the extension-side inlet check valve 44 open resisting the urging force of the leaf spring 60, and flows to the gap 59 (see FIG. 7).

The oil flowed into the gap 59 pushes the main valve 55 open resisting the force in the valve closing direction caused by the leaf spring 58 and the back pressure of the pilot chamber 57, passes through the gap 80, the oil hole 54c of the passage member 54, and the oil hole 46d of the main valve member 46 from the gap 59, pushes the extension-side outlet check valve 47 open, and flows into the piston-side oil chamber 51. At this point, a main extension side damping force is generated in the shock absorber 1 by flow resistance caused when the oil passes through the main valve 55. Note that, for example, by stacking a plurality of disk valves in the extension-side outlet check valve 47, an extension side damping force may be auxiliarily generated in the extension-side outlet check valve 47 in addition to the main extension side damping force generated in the main valve 55.

A part of the oil passed through the oil holes 43b of the valve seat member 43 and flowed into the gap 59 passes through the pilot channel and merges into the oil flowing through the main channel. Specifically, as indicated by the broken line arrows in FIG. 7, a part of the oil passed through the oil holes 43b of the valve seat member 43 and flowed into the gap 59 passes through the oil hole 55a of the main valve 55 from the channel 56 on the outer circumference side of the main valve 55 and flows into the pilot chamber 57.

The oil flowed into the pilot chamber 57 passes through the oil holes 54e and 54d of the passage member 54, the oil hole 71 of the valve seat member 49, and the gap between the valve body 77 and the valve seat 71a and flows into the space 72 of the valve seat member 49. The oil flowed into the space 72 of the valve seat member 49 passes through the oil hole 77a formed in the valve body 77, pushes the check valve 75 open resisting the urging force of the spring 76, and flows into the space 74 of the core 63. The oil flowed into the space 74 passes through the oil hole 49c of the valve seat member 49, the channels 62 and 61, and the oil hole 54c of the passage member 54, and merges into the oil flowing through the main channel.

Incidentally, in the extension side stroke, an amount of the oil equivalent to the volume of the piston rod 3 exiting the inner cylinder 2a of the cylinder 2 passes through the oil hole 43d of the valve seat member 43 from the reservoir 30 and flows into the space 43a. The oil flowed into the space 43a flows into the gap 80 and merges into the oil flowing through the main channel. In this way, the amount of oil equivalent to the volume of the piston rod 3 exiting the inner cylinder 2a of the cylinder 2 is supplied to the piston-side oil chamber S1 from the reservoir 30. Consequently, a capacity change in the inner cylinder 2a involved in an exit of the piston rod 3 from the inner cylinder 2a of the cylinder 2 is compensated.

Hydraulic Circuit Shown in FIG. 9

As shown in FIG. 9, the reservoir 30 may be provided to communicate with the piston-side oil chamber S1 without being juxtaposed with the damping-force generating device 40. Note that, in this case, the damping-force generating device 40 and the reservoir 30 are provided on the outside of the piston 11 and furthermore the outside of the cylinder 2.

The hydraulic circuit includes, as shown in FIG. 9, the main valve 55, the back-pressure adjusting section 40b, the compression-side inlet check valve 45, the compression-side outlet check valve 42, the extension-side inlet check valve 44, and the extension-side outlet check valve 47. The reservoir 30 is provided to directly communicate with the piston-side oil chamber S1. Note that, in order to lead a predetermined amount of the oil equivalent to the volume of the piston rod 3 entering the inner cylinder 2a of the cylinder 2 into the reservoir 30, for example, a not-shown orifice or a not-shown check valve is provided in an inlet of the reservoir 30 to adjust an amount of the oil to be led into the reservoir 30.

When the hydraulic circuit explained above is provided, since the reservoir 30 is not juxtaposed with the damping-force generating device 40, for example, the oil holes 43d of the valve seat member 43 and the oil chamber S shown in FIG. 3 are unnecessary. The reservoir 30 shown in FIG. 9 includes a channel separately communicating with the piston-side oil chamber S1.

(3-1) Compression Side Stroke

In the shock absorber 1 including such a hydraulic circuit, in the compression side stroke, a flow of the oil is indicated by solid line arrows in the hydraulic circuit shown in FIG. 9. Specifically, the oil in the piston-side oil chamber 51, the pressure of which increases because the piston rod 3 moves upward relatively to the cylinder 2, is supplied to the first oil chamber S3 of the damping-force generating device 40 shown in FIGS. 2 and 3 from the oil hole 19 shown in FIG. 1.

A part of the oil in the piston-side oil chamber 51 is led into the reservoir 30. An amount of the oil led into the reservoir 30 is equivalent to the volume of the piston rod 3 entering the inner cylinder 2a of the cylinder 2. Consequently, a capacity change in the inner cylinder 2a involved in an entry of the piston rod 3 into the inner cylinder 2a of the cylinder 2 is compensated.

A flow of the oil from the first oil chamber S3 is the same as the flow explained in (1-1) compression side stroke above except a flow of the oil led into the reservoir 30.

(3-2) Extension Side Stroke

In the extension side stroke, a flow of the oil is indicated by broken line arrows in the hydraulic circuit shown in FIG. 9. Specifically, the oil in the rod-side oil chamber S2, the pressure of which increases because the piston rod 3 moves downward relatively to the cylinder 2, is supplied to the second oil chamber S4 of the damping-force generating device 40 shown in FIGS. 2 and 3 through the oil hole 21 formed in the inner cylinder 2a, the channel 20 between the inner cylinder 2a and the outer cylinder 2b, and the oil hole 22 formed in the outer cylinder 2b and the channel 23 shown in FIG. 1.

The oil in the reservoir 30 is supplied to the piston-side oil chamber 51. Consequently, a capacity change in the inner cylinder 2a involved in an exit of the piston rod 3 from the inner cylinder 2a of the cylinder 2 is compensated.

A flow of the oil from the second oil chamber S4 is the same as the flow explained in (1-2) extension side stroke above except a flow of the oil led out from the reservoir 30.

Hydraulic Circuit Shown in FIG. 10

As shown in FIG. 10, the functions of the hydraulic circuit may also be provided in the piston 11 and provided to communicate with the piston-side oil chamber 51. That is, the damping-force generating device 40 not juxtaposed with the reservoir 30 may be provided on an inside of the piston 11 of the cylinder 2. Note that the reservoir 30 is provided on the outside of the piston 11 and furthermore the outside of the cylinder 2.

The hydraulic circuit is the same as the hydraulic circuit shown in FIG. 8 except that the hydraulic circuit does not include the reservoir 30. The configuration of the reservoir 30 is the same as the configuration of the reservoir 30 shown in FIG. 9.

(4-1) Compression Side Stroke

In the shock absorber 1 including such a hydraulic circuit, in the compression side stroke, a flow of the oil is indicated by solid line arrows in the hydraulic circuit shown in FIG. 10. A specific flow of the oil is the same as the flow explained in (2-1) compression side stroke above except a flow of the oil led into the reservoir 30.

A part of the oil in the piston-side oil chamber S1 is led into the reservoir 30. An amount of the oil led into the reservoir 30 is equivalent to a volume of the piston rod 3 entering the inner cylinder 2a of the cylinder 2. Consequently, a capacity change in the inner cylinder 2a involved in an entry of the piston rod 3 into the inner cylinder 2a of the cylinder 2 is compensated.

(4-2) Extension Side Stroke

In the extension side stroke, a flow of the oil is indicated by broken line arrows in the hydraulic circuit shown in FIG. 10. Note that a specific flow of the oil is the same as the flow explained in (2-2) extension side stroke above except a flow of the oil led out from the reservoir 30.

The oil in the reservoir 30 is supplied to the piston-side oil chamber S1. Consequently, a capacity change in the inner cylinder 2a involved in an exit of the piston rod 3 from the inner cylinder 2a of the cylinder 2 is compensated.

As explained above, in the shock absorber 1 in the embodiment, the damping-force generating device 40 has a configuration in which, as shown in FIGS. 3 and 4, the first pressure chamber PS1 and the second pressure chamber PS2 overlap in the radial direction in the substantially double-ring structure. The configuration of the substantially double-ring structure can be configured irrespective of whether the damping-force generating device 40 is provided on the outside of the piston 11 and the cylinder 2 as shown in FIGS. 5 and 9 or the damping-force generating device 40 is provided on the inside of the piston 11 and the cylinder 2 as shown in FIGS. 8 and 10. With the configuration of the substantially double-ring structure, it is possible to attain compactness of a space.

In the damping-force generating device 40, the compression-side inlet check valve 45 and the extension-side inlet check valve 44 that allow only inflow of the oil are provided in the first pressure chamber PS1, and the compression-side outlet check valve 42 and the extension-side outlet check valve 47 that allow only outflow of the oil are provided in the second pressure chamber PS2. Therefore, in the compression side stroke, the oil flows in the order of the compression-side inlet check valve 45, the first pressure chamber PS1, the main valve 55, the second pressure chamber PS2, and the compression-side outlet check valve 42. In the extension side stroke, the oil flows in the order of the extension-side inlet check valve 44, the first pressure chamber PS1, the main valve 55, the second pressure chamber PS2, and the extension-side outlet check valve 47. Therefore, irrespective of which of the first pressure chamber PS1 and the second pressure chamber PS2 is on the inside or the outside, a flow of the oil that passes through the gap between the main valve 55 and the valve seat member 43 from the first pressure chamber PS1 and flows into the second pressure chamber PS2 is in the same direction in both of the compression side stroke and the extension side stroke. That is, in both of the compression side stroke and the extension side stroke, the oil flows in the same direction (one way) from the radial direction outer side toward the radial direction inner side between one end of the main valve 55 and the valve seat member 43. Therefore, compared with when the oil flows in different directions in the compression side stroke and the extension side stroke, it is possible to simplify structure of the damping-force generating device 40 that generates an appropriate damping force. Consequently, it is possible to reduce the number of components of the damping-force generating device 40 and attain a reduction in costs.

The damping-force generating device 40 includes, in addition to one main valve 55, one pilot chamber 57 that causes an internal pressure in the valve closing direction to act on the main valve 55 and the damping-force adjusting section 70 that adjusts the internal pressure of the pilot chamber 57. In the damping-force adjusting section 70, in particular, the valve body 77 is spaced from the valve seat 71a or is seated on the valve seat 71a, whereby the internal pressure of the pilot chamber 57 is adjusted. The channel resistance of a main flow of the oil passing through the gap between the main valve 55 and the valve seat member 43 is adjusted based on a differential pressure between the valve opening pressure of the main valve 55 and the internal pressure in the valve closing direction of the pilot chamber 57. The internal pressure of the pilot chamber 57 can be adjusted by a small load for driving the valve body 77. Therefore, it is possible to adjust the damping force in a wide range.

In the damping-force generating device 40, a flow of the oil from the first pressure chamber PS1 to the pilot chamber 57 and from the pilot chamber 57 to the second pressure chamber PS2 in the pilot channel can be set in the same direction in both of the compression side stroke and the extension side stroke like the main flow of the oil that passes through the gap between the main valve 55 and the valve seat member 43.

In particular, in the damping-force generating device 40, high levels of accuracy, complexity, and the like are requested for the components configuring the main valve 55 and the pilot chamber 57 that causes the internal pressure in the valve closing direction to act on the main valve 55 in the shock absorber 1. Therefore, by configuring one main valve 55 and one pilot chamber 57 as one set and setting each of the main flow of the oil and the flow of the oil in the pilot channel in the same direction (one way) in both of the compression side stroke and the extension side stroke as in the embodiment, it possible to further simplify structure of the damping-force generating device 40 that generates the appropriate damping force. Consequently, it is possible to further reduce the number of components of the damping-force generating device 40 and attain the reduction in costs.

Incidentally, in principle, the valve body 77 configuring the damping-force adjusting section 70 is designed to be smaller than the main valve 55 in order to close the main valve 55 from the opposite side of the main flow of the oil. Since it is reasonable to arrange the components generally coaxially with a rod shaft, for example, a diameter of the valve body 77 needs to be designed to be smaller than a diameter of one end of the main valve 55 seated on the end face of the valve seat member 43. Therefore, it is natural that a channel near the pilot chamber 57 is relatively arranged further on an inner circumferential side than an outer circumferential side of the main valve 55. For example, it is natural that the downstream-side pilot channel is present further on the radial direction inner side than one end of the main valve 55 seated on the end face of the valve seat member 43. In this case, further compactness of the damping-force generating device 40 can be attained. In particular, further compactness of the damping-force generating device 40 can be attained when an outer circumference of one end of the channel 61, which is a part of the downstream-side pilot channel and is on a side merging with the main channel, is present further on the radial direction inner side than the outer circumference of one end of the main valve 55 seated on the end face of the valve seat member 43.

In terms of a configuration, the upstream side of the main valve 55, the pilot chamber 57, the damping-force adjusting section 70, and the downstream side of the main valve 55 need to be connected in this order. Therefore, a smooth configuration can be obtained by that the inner circumferential side of the main valve 55 is present downstream and does not cross the channel on the pilot chamber 57 side. Therefore, it is possible to configure the damping-force generating device 40 more compact.

In the present invention, the main valve 55 is formed in the substantially cylindrical shape. Therefore, it is possible to machine the main valve 55 inexpensively and easily. This is because a substantially cylindrical component can be easily lathe-machined and, with the lathe machining, components that require high accuracy such as a valve can be manufactured more inexpensively and easily than the other machining methods such as milling.

Further, as shown in the embodiments in FIGS. 5 and 9, the damping-force generating device 40 can be arranged in any position on the outside of the cylinder 2. It is possible to increase a degree of freedom of a layout concerning, for example, arrangement of the components configuring the damping-force adjusting section 70 that controls the internal pressure of the pilot chamber 57. Therefore, it is also possible to increase a degree of freedom of a layout concerning, for example, arrangement of the solenoid section 50, which is the actuator, and handling of a harness and the like.

In the embodiments shown in FIGS. 4, 5, and 8, by connecting the reservoir 30 to the second pressure chamber PS2 on the downstream side, excessive inflow of the oil into the reservoir 30 can be avoided, and therefore it is possible to increase a degree of freedom of a damping force adjustment range, in particular, on the compression side, without limitation of pressure.

Note that, in the embodiments shown FIGS. 4, 5 and 9, as an example, the present invention is applied to the shock absorber 1 used as the rear cushion of the motorcycle configured by providing the damping-force generating device 40 on the outside of the cylinder 2. However, the present invention can also be applied to a shock absorber used as a rear cushion configured by compactly incorporating the damping-force generating device 40 in the piston 11, as shown in FIGS. 8 and 10. By providing the damping-force generating device 40 on the inside of the piston 11 in this way, the damping-force generating device 40 can be configured compact without projecting to an outside of the shock absorber 1.

The present invention can also be applied to a shock absorber used as a front fork of a motorcycle configured by providing a damping-force generating device on an outside of a cylinder or a shock absorber used as a front fork configured by compactly incorporating a damping-force generating device in a piston. In this case, effects same as the effects explained above can be obtained.

In the embodiments, examples, in which the present invention is applied to an inverted shock absorber configured by attaching the cylinder to the vehicle-body side and attaching the piston rod to the axle side, are shown. Further, the present invention can also be applied to an upright shock absorber configured by attaching a piston rod to a vehicle body side and attaching a cylinder to an axle side.

In the embodiments, examples, in which the present invention is applied to the shock absorber used as the rear cushion that suspends the rear wheel of the motorcycle on the vehicle body, are shown. Further, it goes without saying that the present invention can also be applied to a shock absorber that suspends wheels of any vehicle other than the motorcycle.

Several embodiments of the present invention are explained above. However, the embodiments are presented as examples and are not intended to limit scope of the invention. These new embodiments can be implemented in other various forms. Various omissions, substitutions, and changes can be made without departing from the spirit of the invention. These embodiments and modifications thereof are included in the scope and a gist of the invention and included in the scope of the invention described in claims and equivalents of the invention.

What is claimed is:

1. A shock absorber comprising:
    a cylinder in which working fluid is sealed;
    a piston that is slidably fitted into the cylinder;
    a piston rod that is coupled to the piston and extends to an outside of the cylinder; and
    a damping-force generating device that controls a flow of the working fluid in a compression side stroke and an extension side stroke caused by sliding of the piston in the cylinder, thereby generating a damping force,
wherein the damping-force generating device includes:
    a main valve that opens and closes for controlling the flow of the working fluid caused by the sliding of the piston in the cylinder, thereby generating the damping force;
    a first pressure chamber and a second pressure chamber separated by the main valve;
    a compression-side inlet check valve and an extension-side inlet check valve that allow only inflow of the working fluid into the first pressure chamber; and
    a compression-side outlet check valve and an extension-side outlet check valve that allow only outflow of the working fluid from the second pressure chamber,
    wherein the first pressure chamber and the second pressure chamber are formed in a substantially double-ring structure viewed in a planar cross section perpendicular to an axial direction of the damping-force generating device;
    wherein the first pressure chamber is on an outer ring side of the double-ring structure and the second pressure chamber is on an inner ring side of the double-ring structure.

2. The shock absorber according to claim 1, wherein the damping-force generating device further includes:
    a pilot chamber of which internal pressure acts on the main valve in a valve closing direction with pressure of the working fluid branching from the first pressure chamber; and
    a damping-force adjusting valve that is provided between the pilot chamber and the second pressure chamber for adjusting the internal pressure of the pilot chamber.

3. The shock absorber according to claim 1, wherein the main valve is substantially cylindrical.

4. The shock absorber according to claim 1, wherein an outer circumference on one end side of the main valve in an axial direction of the main valve is positioned radially inwardly than an outer circumference on other end side of the main valve in the axial direction of the main valve.

5. The shock absorber according to claim 1, wherein the damping-force generating device is provided outside the piston.

6. The shock absorber according to claim 1, wherein the damping-force generating device is provided inside the piston.

7. The shock absorber according to claim 1, wherein the first pressure chamber and the second pressure chamber have an annular shape in the axial direction and overlap each other in a radial direction of the damping-force generating device.

8. The shock absorber according to claim 1, wherein the damping-force generating device is provided outside the cylinder.

* * * * *